US011572183B1

(12) United States Patent
Overfield et al.

(10) Patent No.: US 11,572,183 B1
(45) Date of Patent: Feb. 7, 2023

(54) APPARATUSES AND METHODS FOR PRECONDITIONING A POWER SOURCE OF AN ELECTRIC AIRCRAFT

(71) Applicant: BETA AIR, LLC, South Burlington, VT (US)

(72) Inventors: Sarah Overfield, South Burlington, VT (US); Sean Donovan, Richmond, VT (US); Sam Wagner, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/574,978

(22) Filed: Jan. 13, 2022

(51) Int. Cl.
| | | |
|---|---|---|
| *B64D 27/24* | (2006.01) | |
| *G05D 1/08* | (2006.01) | |
| *B60L 50/00* | (2019.01) | |
| *G06N 20/00* | (2019.01) | |
| *G08G 5/00* | (2006.01) | |
| *G05D 1/00* | (2006.01) | |
| *B60L 50/60* | (2019.01) | |
| *B64D 45/00* | (2006.01) | |

(52) U.S. Cl.
CPC ............ *B64D 27/24* (2013.01); *B60L 50/66* (2019.02); *B64D 45/00* (2013.01); *G05D 1/0088* (2013.01); *G06N 20/00* (2019.01); *G08G 5/003* (2013.01); *B60L 2200/10* (2013.01)

(58) Field of Classification Search
CPC ......... B64D 27/24; B64D 45/00; B60L 50/66; B60L 2200/10; G05D 1/0088; G06N 20/00; G08G 5/003
See application file for complete search history.

(56) References Cited

U.S. PATENT DOCUMENTS

| | | | |
|---|---|---|---|
| 7,755,329 B2 | 7/2010 | Kohn et al. | |
| 9,488,979 B1 * | 11/2016 | Chambers | G05D 1/0022 |
| 9,997,080 B1 * | 6/2018 | Chambers | G08G 5/0013 |
| 10,300,808 B2 | 5/2019 | Newman et al. | |
| 10,328,805 B1 * | 6/2019 | Wyrobek | B60L 53/00 |
| 10,355,327 B1 | 7/2019 | Roberts et al. | |
| 10,864,995 B2 | 12/2020 | Chang et al. | |
| 10,870,368 B2 | 12/2020 | Ing et al. | |
| 10,960,785 B2 | 3/2021 | Villanueva et al. | |
| 11,164,464 B1 * | 11/2021 | Marriott | B64C 39/024 |
| 11,175,346 B2 * | 11/2021 | Schweitzer | G01N 29/12 |
| 2012/0053771 A1 * | 3/2012 | Yoshida | B60L 55/00 |
| | | | 701/22 |

(Continued)

OTHER PUBLICATIONS

Shayok Mukhopadhyay, Sheehan Fernandes, Mohammad Shihab, Danial Waleed, Using small capacity fuel cells onboard drones for battery cooling: An experimental study, Jun. 30, 2018.

*Primary Examiner* — Tyler J Lee
(74) *Attorney, Agent, or Firm* — Caldwell Intellectual Property Law, LLC

(57) ABSTRACT

A system for preconditioning a power source of an electric aircraft is presented. The apparatus includes a power source of an electric aircraft, a computing device, and a user device. The computing device is configured to receive a flight plan, determine a predicted power usage model as a function of the flight plan, and initiate a power source modification on the electric aircraft as a function of the predicted power usage model. The user device is configured to display a flight performance infographic as a function of the predicted power usage model.

20 Claims, 10 Drawing Sheets

(56) References Cited

U.S. PATENT DOCUMENTS

| | | | |
|---|---|---|---|
| 2016/0253908 A1* | 9/2016 | Chambers | G08G 5/006 |
| | | | 701/2 |
| 2020/0290742 A1* | 9/2020 | Kumar | B64D 27/10 |
| 2021/0061477 A1 | 3/2021 | Heironimus | |
| 2021/0171197 A1* | 6/2021 | Anderson | H01R 12/523 |
| 2021/0194244 A1 | 6/2021 | Kawamura et al. | |
| 2021/0232134 A1* | 7/2021 | Chantz | G05D 1/0202 |

* cited by examiner

APPARATUSES AND METHODS FOR PRECONDITIONING A POWER SOURCE OF AN ELECTRIC AIRCRAFT

FIELD OF THE INVENTION

The present invention generally relates to the field of software application for preconditioning a power source of an electric aircraft. In particular, the present invention is directed to apparatuses and methods for preconditioning a power source of an electric aircraft.

BACKGROUND

Flight preparations for an electric aircraft are vital for optimizing safe and efficiency operation. Such preparations can require a multitude of complex operations involving the electric aircraft.

SUMMARY OF THE DISCLOSURE

In an aspect, an apparatus for preconditioning a power source of an electric aircraft is presented. The apparatus includes a power source of an electric aircraft, a computing device, and a user device. The computing device is configured to receive a flight plan, determine a predicted power usage model as a function of the flight plan, and initiate a power source modification on the electric aircraft as a function of the predicted power usage model. The user device is configured to display a flight performance infographic as a function of the predicted power usage model.

In another aspect, a method for preconditioning a power source of an electric aircraft is presented. The method comprises receiving, by a computing device, a flight plan, determining a predicted power usage model as a function of the flight plan, initiating a power source modification on the electric aircraft as a function of the predicted power usage model, and displaying a flight performance infographic as a function of the power usage model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
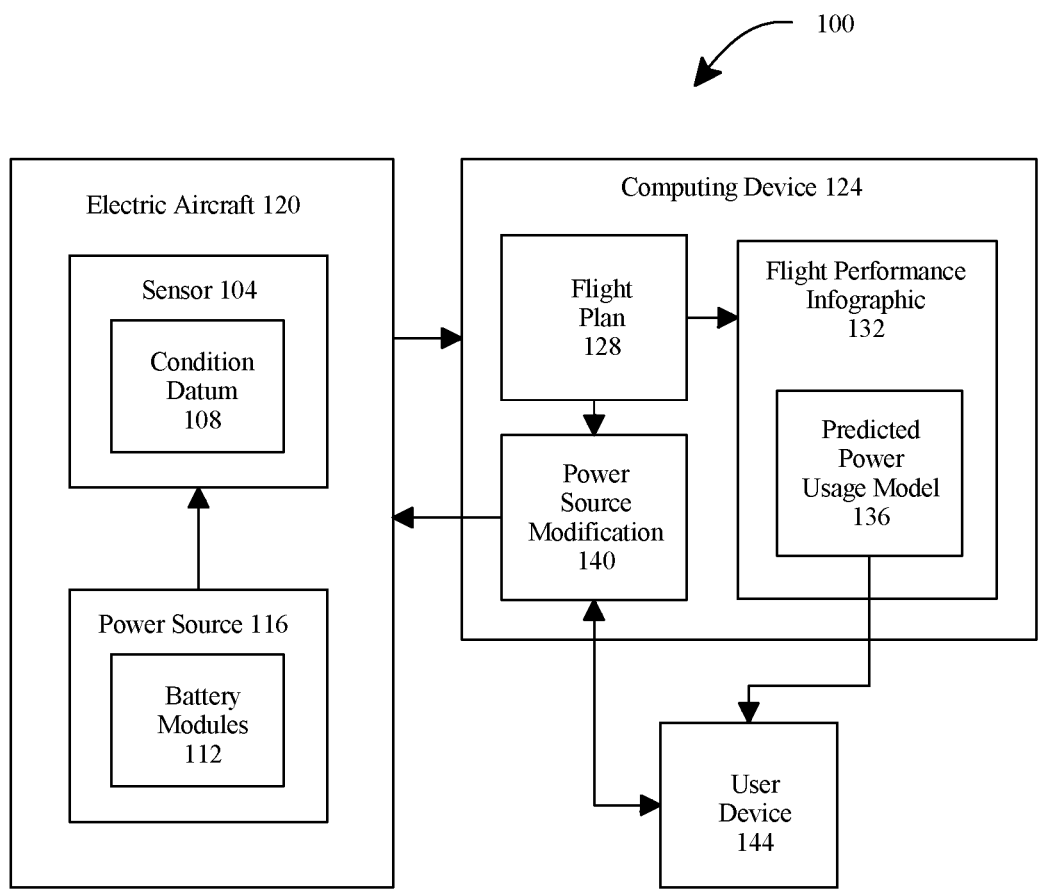
FIG. 1 is a block diagram of an exemplary embodiment of an apparatus for preconditioning a power source of an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for apparatuses and methods for preconditioning a power source of an electric aircraft. In an embodiment, an electric aircraft may perform preconditioning operations to prepare its power source for recharging. The electric aircraft may heat up its power source in advance as it approaches a destination for recharging purposes. The heated up power source may better receive charge and reduce the time it takes to charge the power source. Aspects of the present disclosure can allow the electric aircraft to automatically initiate preconditioning operations. In an embodiment, the electric aircraft may receive a flight plan and initiate the preconditioning operations at a specific point in the flight plan before arriving at a charging destination. In an embodiment, the electric aircraft may have sensors that may detect a proximity to the location and initiate the preconditioning operations in preparation for recharging the power source of the electric aircraft once landed.

Aspects of the present disclosure can be used as a software application. Aspects of the present disclosure can also be used to generate visual infographics describing the preconditioning operations that may be readable and understandable to a pilot of the electric aircraft or another user. This is so, at least in part, to inform the pilot or user of preconditioning operations and the contextual flight information involving the preconditioning operations. In an embodiment, the electric aircraft may be equipped with an aircraft dashboard comprising of a plurality of flight instruments such as a display. The display may include functional primary flight display (PFD), a functional electronic instrument system (EFIS), a functional electronic horizontal situation indicator (EHSI), or the like thereof. The display may display the visual infographics to the pilot flying the electric aircraft, informing the pilot of the events that will occur and related flight information as a function of the preconditioning operations. In an embodiment the display may be an interactive device in which the pilot may manipulate the visual infographics to view various flight information or trigger various actions on the electric aircraft involving the preconditioning operations. In another embodiment, a remotely located user may interact with a user device which may be located remotely from the electric aircraft to view the visual infographics and the preconditioning operations in real time.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes in FIG. 5. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, an exemplary embodiment of a apparatus 100 for preconditioning a power source of an electric aircraft is illustrated. Apparatus 100 includes a computing device 124. In a non-limiting embodiment, computing device 124 may include a flight controller. For example and without limitation, computing device 124 may be integrated into the electric aircraft. computing device 124 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 124 may include a single computing device operating independently, or may include two or more computing device operating in concert, in parallel, sequentially or the like; two or more computing devices may be included together in a single computing device or in two or more computing devices. computing device 124 may interface or communicate with one or more additional devices as described below in further detail via a network interface device. Network interface device may be utilized for connecting computing device 124 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 124 may include but is not limited to, for example, a computing device or cluster of computing devices in a first location and a second computing device or cluster of computing devices in a second location. computing device 124 may include one or more computing devices dedicated to data storage, security, distribution of traffic for load balancing, and the like. computing device 124 may distribute one or more computing tasks as described below across a plurality of computing devices of computing device, which may operate in parallel, in series, redundantly, or in any other manner used for distribution of tasks or memory between computing devices. computing device 124 may be implemented using a "shared nothing" architecture in which data is cached at the worker, in an embodiment, this may enable scalability of apparatus 100 and/or computing device.

With continued reference to FIG. 1, computing device 124 may be designed and/or configured to perform any method, method step, or sequence of method steps in any embodiment described in this disclosure, in any order and with any degree of repetition. For instance, computing device 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Alternatively or additionally, and still referring to FIG. 1, computing device 124 that includes the flight controller may be controlled by one or more Proportional-Integral-Derivative (PID) algorithms driven, for instance and without limitation by stick, rudder and/or thrust control lever with analog to digital conversion for fly by wire as described herein and related applications incorporated herein by reference. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/or digital integrators and differentiators, as a non-limiting example. A similar philosophy to attachment of flight control systems to sticks or other manual controls via pushrods and wire may be employed except the conventional surface servos, steppers, or other electromechanical actuator components may be connected to the cockpit inceptors via electrical wires. Fly-by-wire systems may be beneficial when considering the physical size of the aircraft, utility of for fly by wire for quad lift control and may be used for remote and autonomous use, consistent with the entirety of this disclosure. The computing device may harmonize vehicle flight dynamics with best handling qualities utilizing the minimum amount of complexity whether it be additional modes, augmentation, or external sensors as described herein.

With continued reference to FIG. 1, apparatus 100 may include an electric aircraft 120. In a non-limiting embodiment, electric aircraft 120 may include any electrical flying vehicle such as, but not limited to, an electric vertical take-off and landing (eVTOL) aircraft, unmanned aerial vehicle (UAV), drone, etc. Apparatus 100 may include a sensor 104 attached to a power source 116 of electric aircraft 120. A "power source," as used in this disclosure is an electrical device and/or component used to store and provide electrical energy to an electrical aircraft and its electrical subsystems. For example, and without limitation, power source 116 may be a battery and/or a battery pack having one or more battery modules 112. Power source 116 may include a plurality of battery packs. For instance and without limitation, the battery pack may be consistent with the battery pack in U.S. patent application Ser. No. 17/529,447, and entitled "A MODULE MONITOR UNIT FOR AN ELECTRIC AIRCRAFT BATTERY PACK AND METHODS OF USE," which is incorporated by reference herein in its entirety. In one or more embodiments, power source 116 may be one or more various types of batteries, such as a pouch cell battery, stack batteries, prismatic battery, lithium-ion cells, or the like. In one or more embodiments, power source 116 may include a battery, flywheel, rechargeable battery, flow battery, glass battery, lithium-ion battery, ultra-battery, and the like thereof.

With continued reference to FIG. 1, a "sensor," for the purpose of this disclosure, is a device that is configured to detect an input and/or a phenomenon and transmit information related to the detection. For example, and without limitation, a sensor may transduce a detected phenomenon, such as without limitation, temperature, voltage, current, pressure, and the like, into a sensed signal. In a non-limiting embodiment, sensor 104 may include one or more pack monitor units (PMU) attached to a battery pack of the plurality of battery packs of power source 116. In a non-limiting embodiment, sensor 104 may include a plurality of module monitor units (MMU) attached to a battery module of a plurality of battery modules 112. For instance and without limitation, the pack monitor unit may be consistent with the pack monitor unit in U.S. patent application Ser. No. 17/529,447. In another instance and without limitation, the module monitor unit may be consistent with the MMU in U.S. patent application Ser. No. 17/529,447. In one or more embodiments, and without limitation, sensor 104 may include a plurality of sensors. In one or more embodiments, and without limitation, sensor 104 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 104 may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by sensor 104 may include circuitry, computing devices, electronic components or a combination thereof that translates into at least an electronic signal configured to be transmitted to another electronic component. In a non-limiting embodiment, sensor 104 may include a plurality of sensors comprised in a sensor suite. For example and without limitation, sensor 104 may include flow sensors, temperature sensors, altimeters, pressure sensors, proximity sensors, airspeed indicators, position sensors, global positioning system (GPS), humidity sensors, level sensors, gas sensors, wireless sensor networks (WSN), compasses, magnetometers, altitude heading and reference systems (AHRSes), tachometers, etc. In a non-limiting embodiment, sensor 104 may be communicatively connected to the electric aircraft of apparatus 100. As used in this disclosure, "communicatively connected" is defined as a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. Persons skilled in the art, upon reviewing the entirety of this disclosure, will be aware of the various embodiments of controlling a cursor for visual data manipulation for purposes as described herein. Persons skilled in the art, upon reviewing the entirety of this disclosure, will also be aware of the various warning symbols that may be employed to grab the attention of a pilot in the context of simulation consistently described in the entirety of this disclosure.

With continued reference to FIG. 1, sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, and the like. In a non-limiting embodiment, sensor 104 may use of active range finding methods which may include, but not limited to, light detection and ranging (LIDAR), radar, sonar, ultrasonic range finding, forward-looking infrared (FLIR) cameras, enhanced vision systems (EVS), short wave infrared (SWIR) imagers, or the like thereof. In another non-limiting embodiment, sensor 104 may include a moisture sensor. "Moisture", as used in this disclosure, is the presence of water, which may include vaporized water in air, condensation on the surfaces of objects, or concentrations of liquid water. Moisture may include humidity. "Humidity", as used in this disclosure, is the property of a gaseous medium (almost always air) to hold water in the form of vapor. In one or more embodiments, sensor 104 may include electrical sensors. Electrical sensors may be configured to measure voltage across a component, electrical current through a component, and resistance of a component. In one or more embodiments, sensor 104 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 104, may be measured in Fahrenheit (° F.), Celsius (° C.), Kelvin (° K), or another scale alone or in combination. The temperature measured by sensors may comprise electrical signals, such as condition data 108, which are transmitted to their appropriate destination wireless or through a wired connection.

Still referring to FIG. 1, sensor 104 may be installed onto a plurality of flight instruments of the electric aircraft. As used in this disclosure, a "flight instrument," is defined as an instrument used to provide information involving the flight situation of an electric aircraft it is installed on. In some embodiments, the information of the flight situation may include, but not limited to, altitude, attitude, airspeed, vertical speed, heading, and the like thereof. Sensor 104 installed onto the flight instruments may include an accelerometer, a gyroscope, a torque monitor, tachometers, engine temperature gauges, fuel- and oil-quantity gauges, pressure gauges, altimeters, airspeed-measurement meters, vertical speed indicators and/or combination thereof. In another embodiment, sensor 104 may include radars such as, doppler radars, lightning-detection radars, terrain radars, anti-collision warning systems, stall warning systems, etc. In a non-limiting embodiment, various types of sensor 104 may be used to inform the pilot of the electric aircraft or a user interacting with a remote device in communication with the electric aircraft to take proper action and precaution, and prevent any kind of disaster or accident. Any information captured by sensor 104 may be used for ground testing, flight testing, vibration, environment, angle of attack, static, and the like thereof. Sensor 104 may include a sensor suite which may include a plurality of sensors, wherein the sensors may include any sensor described herein.

Still referring to FIG. 1 may be integrated and/or communicatively connected to at least an actuator and/or flight component, a portion thereof, or any subcomponent thereof of the electric aircraft. An "actuator," for the purpose of this disclosure, is a device configured to produce motion. A "flight component," for the purpose of this disclosure, is a device that produces motion and/or power for an electric aircraft. In a non-limiting embodiment, the actuator may be consistent with any flight component as described herein. For example and without limitation, sensor 104 may be disposed onto a plurality of actuators and/or flight components such as, vertical propulsors, forward pushers, motors, electric motors, electric energy source, ailerons, rudders, wings, wing tips, tail, etc. In a non-limiting embodiment, flight components and/or actuators may be any part of an electric aircraft that helps it to achieve physical movements by converting energy, often electrical, air, or hydraulic, into mechanical force and enable movement. "Disposed," for the purpose of this disclosure, is the physical placement of an electrical device on a part of an electric aircraft. Persons skilled in the art, upon reviewing the entirety of this disclosure, will be aware of the various placements of a variety of sensors onto a variety of flight components for capturing data related to the functions of the individual flight components.

With continued reference to FIG. 1, sensor 104 may be configured to detect measured aircraft data. A "measured aircraft data," for the purpose of this disclosure, is any signals representing information captured by sensor 104 or any sensor as described in the entirety of this disclosure. In a non-limiting embodiment, the measured aircraft data may include temperature, voltage, wind resistance, pressure, speed, angles, acceleration, flight speed, flight angle, lag, thrust, lift, and the like thereof. Sensor 104 may also detect a plurality of maneuver data. A "plurality of maneuver data," for the purpose of this disclosure, is any collection of information describing completion by the pilot of procedures and concepts that control the electric aircraft, a simulated electric aircraft, and/or the simulator module. For example and without limitation, the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. For example and without limitation, the plurality of maneuver data may include, ground reference maneuvers, such as turns around a point, s-turns, rectangular ground maneuvering course, eights along A road, eights around pylons, hover taxi, air taxi, surface taxi, and the like. As a further example and without limitation, the plurality of maneuver data may include takeoffs and landings, such as normal takeoff and climb, crosswind takeoff and climb, short field takeoff and climb, normal takeoff from a hover, vertical takeoff to a hover, short field approach and landing, soft field approach and landing, touch and go, power-off 180 approach and landing, normal approach to a hover, crosswind approach to the surface, and the like. The plurality of maneuver data may further include, for example and without limitation, airborne maneuvers, such as trimming the aircraft, slow flight, lazy eights, chandelle, straight and level flight, turns, steep turns, unusual attitudes, spatial disorientation demonstration, hovering, hovering turn, rapid deceleration, reconnaissance procedures, and the like. The plurality of maneuver data, as a further non-limiting example, may include emergency preparedness, such as steep spirals, emergency approach and landing, spins, ditching, autorotation, vortex ring state, retreating blade stall, ground resonance, dynamic rollover, low rotor RPM, systems malfunction, flight diversions, and the like. Further, the plurality of maneuver data may include, as a non-limiting example, instrument procedures, such as aircraft holding procedures, arcing approach, instrument landing system approach, instrument reference climbs and descents, basic attitude instrument flight, and the like. Persons skilled in the art, upon reviewing the entirety of this disclosure, will be aware of various procedures and concepts that may represent the plurality of maneuver data consistently with this disclosure.

With continued reference to FIG. 1, sensor 104 may be configured detect measured state data. A "measured state data," as used in this disclosure, is a datum that is collected via a physical controller area network (CAN) bus unit describing a plurality of functionalities of the electric aircraft. A "physical controller area network bus," as used in this disclosure, is vehicle bus unit including a central processing unit (CPU), a CAN controller, and a transceiver designed to allow devices to communicate with each other's applications without the need of a host computer which is located physically at the electric aircraft. In a non-limiting embodiment, the electric aircraft may include a plurality of physical CAN bus units communicatively connected to the electric aircraft. For instance and without limitation, the physical CAN bus unit may be consistent with the physical CAN bus unit in U.S. patent application Ser. No. 17/218,312 and entitled, "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated by reference herein in its entirety. In a non-limiting embodiment, the measured state data may include a plurality of data signals detailing a control to one or more actuators communicatively connected to the aircraft. Measured state data may include a plurality of data entries relating aircraft pitch, roll, yaw, torque, angular velocity, climb, speed, performance, lift, thrust, drag, battery charge, fuel level, location, and the like. Measured state data may include a plurality of data communicating the status of flight control devices such as proportional-integral-derivative controller, fly-by-wire system functionality, aircraft brakes, impeller, artificial feel devices, stick shaker, power-by-wire systems, active flow control, thrust vectoring, alerion, landing gear, battery pack, propulsor, management components, control surfaces, sensors/sensor suites, creature comforts, inceptor, throttle, collective, cyclic, yaw pedals, MFDs, PFDs, and the like. Measured state data may exist as analogue and/or digital data, originating from physical CAN bus units such as bits, where a series of serial binary data are composed and transmitted relaying a measured state as indicated from a device located within, on, or communicating with the electric aircraft.

Still referring to FIG. 1, sensor 104 may include sensors configured to measure physical and/or electrical parameters, such as, and without limitation, temperature and/or voltage, of power source 116. For example, and without limitation, sensor 104 may monitor voltage and/or temperature of battery modules 112 and/or cells of power source 116. Sensor 104 may be configured to detect failure within each battery module 112, for instance and without limitation, as a function of and/or using detected physical and/or electrical parameters. In one or more exemplary embodiments, battery cell failure may be characterized by a spike in temperature and sensor 104 may be configured to detect that increase in temperature and generate signals, which are discussed further below, to notify users, support personnel, safety personnel, flight crew, maintainers, operators, emergency personnel, aircraft computers, or a combination thereof. In other exemplary embodiments, sensor 104 may detect voltage and direct the charging of individual battery cells according to charge level. Detection may be performed using any suitable component, set of components, and/or mechanism for direct or indirect measurement and/or detection of voltage levels, including without limitation comparators, analog to digital converters, any form of voltmeter, or the like.

Still referring to FIG. 1, sensor 104 may be configured to detect condition datum 108 of power source 116. In one or more embodiments, sensor 104 may be configured to generate a sensor output, which includes condition datum 108. For purposes of this disclosure, a "condition datum" is an electronic signal representing at least an element of data correlated to a quantifiable operating state of a power source. For instance, and without limitation, a power source may need to be a certain temperature to operate properly; condition datum 108 may provide a numerical value, such as temperature in degrees, that indicates the current temperature of power source 116. For example, and without limitation, sensor 104 may be a temperature sensor that detects the temperature of power source 116 to be at a numerical value of 70° F. and transmits the corresponding condition datum to, for example, computing device 124. In another example, and without limitation, sensor 104 may be a current sensor and a voltage sensor that detects a current value and a voltage value, respectively, of power source 116. Such condition datum 108 may then be used to determine an operating condition of power source 116 such as, for example, a state of charge (SoC) or a depth of discharge (DoD) of power source 116. In one or more embodiments, an operating state may include, for example, a temperature state, a state of charge, a moisture-level state, a state of health (or depth of discharge), or the like.

With continued reference to FIG. 1, computing device 124 may be configured to receive a flight plan 128. A "flight plan," for the purpose of this disclosure, is a predetermined path of flight between a departing location and an arriving location for the electric aircraft. A flight plan may include phases of flight such as takeoff, landing, cruising, or the like, one or more flight maneuvers to be performed, modes of flight such as rotor-based or fixed-wing flight to be used in a given phase or during a given flight maneuver, or the like. In a non-limiting embodiment, flight plan 128 may be sent over by an air traffic control (ATC) authority. In a non-limiting embodiment, flight plan 128 may include information describing the path for electric aircraft 120 to follow. Flight plan 128 may include a destination location such as a recharging landing pad. A "recharging landing pad," for the purpose of this disclosure, is an infrastructure designed to dock a plurality of electric aircrafts and maintain, support, and provide electric charge to the electric aircrafts. Flight plan 128 may include recommended flight parameters for electric aircraft 120 to follow. For example and without limitation, flight plan 128 may include instructions for electric aircraft 120 to fly at specific altitudes, velocities, air space, and the like thereof. In a non-limiting embodiment, computing device 124 may include any communication device such as an Automatic Dependent Surveillance-Broadcast (ADS-B). In a non-limiting embodiment, computing device 124 may be integrated into the avionics of electric aircraft 120. Persons skilled in the art, upon reviewing the entirety of this disclosure, will be aware of the various embodiments of computing devices in the context of navigation and communication.

With continued reference to FIG. 1, computing device 124 may be configured to receive flight plan 128 and/or condition datum 108. In a non-limiting embodiment, computing device 124 may include any physical CAN bus units configured to receive transmission signals comprising of any datum received such as flight plan 128 and/or condition datum 108. In a non-limiting embodiment, computing device 124 may be configured to adjust charge to one or more battery modules 112 as a function of a charge level and/or a detected parameter, such as condition datum 108. For instance, and without limitation, computing device 124 may be configured to determine that a charge level of a battery cell is high based on a detected voltage level of that battery cell. Computing device 124 may alternatively or additionally detect a charge reduction event, defined for purposes of this disclosure as any temporary or permanent state of a battery cell requiring reduction or cessation of charging. A charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a preconfigured threshold, detection of a voltage and/or resistance level above or below a preconfigured threshold, or the like, as discussed further below in this disclosure.

Still referring to FIG. 1, a sense board and/or a control circuit incorporated therein and/or communicatively connected thereto may be configured to adjust charge to at least one battery cell of the plurality of battery modules 112 or battery cells as a function of condition datum 108 (this may include adjustment in charge as a function of detection of a charge reduction event). Alternatively or additionally, sense board and/or a control circuit incorporated therein and/or communicatively connected thereto may be configured to increase charge to battery modules 112a-n upon detection that a charge reduction event has ceased. For instance, sense board and/or a control circuit incorporated therein and/or communicatively connected thereto may detect that a temperature of a subject battery cell has dropped below a threshold, and may increase charge again. Charge may be regulated using any suitable means for regulation of voltage and/or current, including without limitation use of a voltage and/or current regulating component, including one that may be electrically controlled such as a transistor; transistors may include without limitation bipolar junction transistors (BJTs), field effect transistors (FETs), metal oxide field semiconductor field effect transistors (MOSFETs), and/or any other suitable transistor or similar semiconductor element. Voltage and/or current to one or more cells may alternatively or additionally be controlled by thermistor in parallel with a cell that reduces its resistance when a temperature of the cell increases, causing voltage across the cell to drop, and/or by a current shunt or other device that dissipates electrical power, for instance through a resistor. Outputs, such as condition datum 108, from sensor 104 or any other component present within apparatus 100 may be analog or digital. Onboard or remotely located processors can convert those output signals from sensor 104 or sensor suite to a usable form by the destination of those signals, such as computing device 124. The usable form of output signals from sensors, through processor may be either digital, analog, a combination thereof, or an otherwise unstated form. Processing may be configured to trim, offset, or otherwise compensate the outputs of sensor suite. Based on sensor output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

Still referring to FIG. 1, computing device 124 may be communicatively connected to sensor 104 and configured to obtain an optimal performance condition of power source 116 of electric aircraft 120. In one or more embodiments, and without limitation, computing device 124 may be a computing device, a flight controller, may be included in a flight controller, or may be a processor. In one or more embodiments, computing device 124 may include a processor that executes instructions provided by for example, a user input, and receives sensor output such as, for example, condition datum 132. For example, flight controller may be configured to obtain an optimal performance condition of power source 116 of electric aircraft 120, where the optimal performance condition is provided by, for example, a user input. For purposes of this disclosure, an "optimal performance condition" is an element of information regarding a maximized and/or a most effective operating state of a power source. In one or more embodiments, an optimal performance condition may include a plurality of optimal performance conditions at various stages of use. In one or more embodiments, various stages of use may include prior to takeoff, during flight, after landing, and the like. For example, and without limitation, an optimal performance condition for an initial SoC of power source 116 may be 100%, or full, where the initial SoC means the SoC of power source 116 prior to takeoff of aircraft 120. In another example, and without limitation, an optimal performance condition for an operating state of an initial temperature of power source 116 may be 75° F., where the initial temperature is the temperature of power source 116 prior to takeoff. In another example, and without limitation, an optimal performance condition for an operating state of a final temperature of power source 116 may be 90° F., where the final temperature is the temperature of power source 116 after landing. In one or more embodiments, an optimal performance condition may include a maximized function of power source 116. For purposes of this disclosure, a "maximized function" is a greatest level of operation and/or condition of an operating state of a power source. For example, and without limitation, an optimal performance condition may include a maximized state of charge of 100%, as previously mentioned. In another example, and without limitation, an optimal performance condition may include a maximized depth of discharge of 0%, suggesting power source 116 is in an ideal state of being brand new. Optimal performance condition may be obtained by computing device 124 in various ways. For example, in non-limiting embodiments, an optimal performance condition may be obtained from a prior use element, where a past optimal condition of a state of power source 116 may be stored in a memory component of computing device 124 for future reference. For the purposes of this disclosure, a "prior use element" is data and/or information obtained from previous experiences related to use of a power source that may be stored in a memory of a computing device. In other non-limiting embodiments, an optimal performance condition is obtained from a user input. For example, and without limitation, a user, such as maintenance personnel, pilot, fleet manager, etc., may manually input an optimal performance condition using, for example, a pilot device and/or user device 144.

With continued reference to FIG. 1, a "pilot device," as used in this, is an interactive and functional electronic instrument within a physical cockpit used by a pilot that provides crucial information in flight. In a non-limiting embodiment, the pilot device may include computing device 124 and/or any computing device. The pilot device may display flight performance infographic 132 and predicted power usage model 136. In a non-limiting embodiment, the pilot device may provide information of the electric aircraft the pilot is piloting such as, but not limited, altitude, airspeed, vertical speed, heading and much more other crucial information in flight. In a non-limiting embodiment, the pilot device may include a functional primary flight display (PFD), a functional electronic instrument system (EFIS), a functional electronic horizontal situation indicator (EHSI), and the like thereof. In a non-limiting embodiment, the simulated avionics may include the equipment and electronics to support communication, navigation, multi-system management, and the like thereof.

Still referring to FIG. 1, computing device 124 may identify an operating condition of an operating component or operating state of power source 116 as a function of the condition datum. For purposes of this disclosure, an "operating condition" is an element of information regarding a current and/or present-time quality or working order of an operating state of a power source and/or a component thereof. Operating condition may be determined based on condition datum 132 provided by sensor 104. For example, and without limitation, an operating condition for a SoC of power source 116 may be 75%. In another example, and without limitation, an operating condition for a DoD (also referred to herein as a "State of Health (SOH)") of power source 116 may be 20%, where DoD refers to a lifetime of power source 116 after repeated use. In yet another example, and without limitation, an operating condition for a state of temperature of power source 116 may be 60° F. due to cool ambient temperatures caused by, for example, environmental weather.

With continued reference to FIG. 1, computing device 124 may be configured to determine a predicted power usage model 136. A "predicted power usage model," for the purpose of this disclosure, is a model or collection of information describing a predictive element for the amount of electrical energy required to satisfy a preconditioning of the power source of an electric aircraft. A "predictive element," as used in this disclosure, is factor that the computing device uses to identify at least a parameter describing the amount of electrical energy is required for a precondition. For example and without limitation, the predictive element may include power source medication 140. In another non-limiting example, the predictive element may include any potential state of the electric aircraft 120 that it wants to achieve. As used in this disclosure, a "preconditioning" is a set of operations to intensify one or more electrical subsystems of the electric aircraft to prepare it for an aircraft operation. The aircraft operation, for example, may include recharging power source 116 of electric aircraft 120. Preconditioning may include a set of operations to modify a temperature of component of an electric aircraft, wherein modifying includes heating, pre-heating, cooling, and/or pre-cooling. This is so, at least in part to set the temperature of power source 116 and its battery pack and/or battery modules 112 at a temperature to receive charging at a higher rate, resulting in an overall faster recharge time.

Persons skilled in the art, upon reviewing the entirety of this disclosure, will be aware of the various embodiments of battery preconditioning for charging purposes as described herein.

Still referring to FIG. 1, computing device 124 may determine predicted power usage model 136 as a function of flight plan 128 and/or condition datum 108. Predicted power usage model 136 may be determined based on the operating condition. In a non-limiting embodiment, predicted power usage model may include a replica of electric aircraft 120 in the form of a virtual representation or simulation. For instance and without limitation, the virtual representation of predicted power usage model 136 may be generated as a function of a flight simulator operating on computing device 124. The flight simulator may be consistent with the flight simulator in U.S. patent application Ser. No. 17/348,916 and entitled, "METHODS AND SYSTEMS FOR SIMULATED OPERATION OF AN ELECTRIC VERTICAL TAKE-OFF AND LANDING (EVTOL) AIRCRAFT, which is incorporated by reference herein in its entirety. In another embodiment, the virtual representation may be consistent with the virtual representation in U.S. patent application Ser. No. 17/348,916. Predicted power usage model 136 may include a collection of information describing the amount of power electric aircraft 120 may use to satisfy preconditioning requirements as described herein.

With continued reference to FIG. 1, computing device 124 may be configured to generate a flight performance infographic 132. A "flight performance infographic," as used in this disclosure, is a graphic visual representation of information, data, or knowledge describing the preconditioning of the electric aircraft and its power source. Flight performance infographic 132 may include predicted power usage model 136. This is so, at least in part, to provide a visual representation of electric aircraft 120 in which parts of the visual representation may be highlighted to inform a pilot and/or user of flight information of electric aircraft 120 in the context of the preconditioning. In a non-limiting embodiment, flight performance infographic may include a visual representation of condition datum 108, optimal performance condition, operating condition of an operating component of the power source, a divergent element, and the like thereof. In another non-limiting embodiment, flight performance infographic 132 may include a plurality of images, signs, symbols, text, and the like thereof, denoting a plurality of information describing the precondition of the electric aircraft. This is so, at least in part for users to view such information and analyze/understand the related flight information for preconditioning of electric aircraft 120. Flight performance infographic 132 may include a plurality of metrics related to the flight and preconditioning of electric aircraft 120. In a non-limiting embodiment, computing device 124 may continuously and/or in real-time update flight performance infographic 132 during a flight. Computing device 124 may transmit an alert in any auditory or visual form indicating the preconditioning of electric aircraft 120 will occur. In a non-limiting embodiment, flight performance infographic may include metrics such as remaining fuel, weather patterns, current temperature, number of battery packs and/or battery modules, and the like thereof. In another non-limiting example, flight performance infographic 132 may include metrics for predicted power usage model 136 such as how much energy is required to be used to satisfy the preconditioning and/or power source modification 140. Predictive metrics may also include predicted recharge time based on predicted power usage model 136. This is so, at least in part to plan ahead for various thermal and electrical flight mission applications as to which a persons skilled in the art, upon reviewing the entirety of this disclosure, will be aware of the various embodiments for the predictive models as described herein.

Still referring to FIG. 1, computing device 124 may determine a divergent element as a function of an optimal performance condition and an operating condition of power source 116. For the purposes of this disclosure, a "divergent element" is a value and/or quantity at which operating condition deviates from optimal performance condition. In one or more embodiments, divergent element may indicate power source 116 is operating outside of a preconfigured threshold (also referred to herein as a "threshold") of optimal performance condition. For the purposes of this disclosure, a "threshold" is a set desired range and/or value that when operating condition is outside of set desired range and/or value, a specific reaction of computing device 124 is initiated. A specific reaction may be, for example, a power source modification 140, which as discussed further below in this disclosure. In one or more embodiments, divergent element may include a divergence magnitude, which indicates a quantity that operating condition is outside of threshold. Threshold may be set by, for example, a user or flight controller based on, for example, prior use or input. In one or more embodiments, if operating condition of power source 116 is determined to be outside of threshold of optimal performance condition, divergent element and divergence magnitude are determined by computing device 124. For example, and without limitation, in cold weather, power source 116 may need to be preheated prior to takeoff to be fully operational. An optimal performance condition for an operating state of temperature may be 75° F. for power source 116. A threshold related to optimal performance may, thus, be set at 75° F. If an operating condition is determined to be 55° F., the divergent element is 20° F., indicating the amount that operating condition is below threshold. Operating condition being below threshold indicates that power source 116 is a temperature considered too low to operate properly. Similarly, if an operating condition is determined to be 80° F. and the threshold is 75° F., then divergent element is 5° F. since operating condition exceeds threshold by 5° F.

With continued reference to FIG. 1, in one or more embodiments, determining divergent element may include one or more thresholds that denote a magnitude and/or level of divergence. For example, and without limitation, a magnitude of divergence may include a "low" divergence, a "medium" divergence, and/or a "high" divergence. In one or more exemplary embodiments, a "low" magnitude of divergence may result in notification of a user via, for example, an indicator or graphic user interface but power source 116 may still be considered in operational condition and, thus, prepared for takeoff. In another example, a user may choose to takeoff despite the determined divergent element or may decide to initiate power source modification 140. For the purposes of this disclosure, a "power source modification" is a signal transmitted to an aircraft system or a power source providing a command to perform a specific modification action to adjust an operating condition of a power source to an optimal condition of the power source and/or adjust the operating condition by the magnitude of divergence. In a non-limiting embodiment, power source modification may include a dynamic modification of electrical components of electric aircraft 120 during flight. For example and without limitation, power source modification 140 may include modifying the temperature of power source 116 which may include heating and/or cooling power source 116 prior to take-off and/or landing. In some embodiments, power source modification 140 may include a command that enables various electrical systems of electric aircraft 120 to achieve a target SoC for power source 116. Alternatively or additionally, power source modification 140 may include a command that enables various electrical systems of electric aircraft 120 to achieve a SoC for power source 116 prior to the lift-off and/or start-up of electric aircraft 120. In a non-limiting embodiment, computing device 124 may be configured to initiate a power source modification 140 as a function of predicted power model 136. In one or more exemplary embodiments, a "medium" magnitude of divergence may result in notification of a user and a required power source modification. For example, and without limitation, if power source is considered too cold to operate, a power source modification of heating power source 116 must be initiated and completed prior to takeoff. In another example, if power source 116 is too hot, a power source modification of cooling down power source 116 must be initiated. In one or more exemplary embodiments, a "high" magnitude of divergence may result in computing device determining that power source requires maintenance and/or replacement prior to takeoff. For example, and without limitation, a power source may require sufficient power for connecting to and operating aircraft subsystems; thus, if power source 116 has a SoC of 30%, electric aircraft 120 cannot takeoff until power source 116 is replaced or fully charged. As understood by one skilled in the art, a divergent element may be determined for power source 116 and/or for each battery module 112 of power source 116.

Still referring to FIG. 1, power source modification 140 may include any preconditioning operation and/or requirements as described herein. In a non-limiting embodiment, power source modification 140 may include any torque allocation, flight maneuvers, attitude rate, attitude angle, angle of attack, aircraft velocity, and the like thereof. Alternatively or additionally, power source modification 140 may include a plurality of operations of the electric aircraft that may be unrelated to the power source of the electric aircraft, but may contribute to efficient recharging of the power source of the electric aircraft. For example and without limitation, in order to precondition power source 116 of electric aircraft 120, electric aircraft 120 may allocate increased or decreased amounts of power usage on various electrical subsystems of electric aircraft 120. In an embodiment, to pre-heat power source 116, electric aircraft 120 may be required to allocate more torque to the electric aircraft's vertical propulsors and forward pushers to heat up the electrical subsystems of electric aircraft 120 and ultimately contribute to heating up and/or cooling down power source 116. In another embodiment, electric aircraft 120 may heat up its cabin, cooling vents, electric motors, etc. Persons skilled in the art, upon reviewing the entirety of this disclosure, will be aware of the various aircraft operations that may be working in tandem to achieve a preconditioning of the power source of an electric aircraft.

With continued reference to FIG. 1, the pilot device may be configured to support the manual initiation of power source modification 140 and/or manually initiate power source modification 140. In a non-limiting embodiment, apparatus 100 may include a software application for the pilot device and/or the pilot device that displays flight performance infographic 132, wherein a user may interact with the software application via the pilot device to manually initiate power source modification 140 and/or the preconditioning of power source 116. In another embodiment, the pilot device may be communicatively connected to electric aircraft 120 in which the pilot device may receive a manually entered instruction that includes a program that initiates power source modification 140. In some embodiments, the pilot device may display flight performance infographic 132 and/or predicted power usage model 136. This is so, at least in part, for a pilot inside electric aircraft 120 to view the flight information and manually perform any preconditioning actions on electric aircraft 120 as necessary. For example and without limitation, the pilot device may include some software that may be visually represented as a function of flight performance infographic 132 to support the manual initiation of power source modification 132 and/or trigger the initiation of power source modification 140. Flight performance infographic 132 may include buttons configured to manually initiate power source modification 140 as a function of it being pressed. Persons skilled in the art, upon reviewing the entirety of this disclosure, will be aware of the various embodiments of software in a device configured to trigger an action for purposes as described herein.

With continued reference to FIG. 1, in a non-limiting embodiment, the pilot may manually adjust the preconditioning parameters of power source 116 and/or electric aircraft 120. For example and without limitation, the pilot may manually modify power source modification 140 parameters via a graphical user interface (GUI) integrated into the pilot device. The pilot may not be satisfied or may be required to adjust preconditioning setups that were originally generated as a function of predicted power usage model 136 and/or the divergent element. The pilot may send various inputs via the pilot device operating the software application of apparatus 100. Persons skilled in the art, upon reviewing the entirety of this disclosure, will be aware of a separate computing device used for receiving and analyzing data from a flying electric aircraft for purposes as described herein.

Still referring to FIG. 1, computing device 124 may initiate power source modification 140 as a function of a divergent element and/or condition datum 108. In one or more embodiments, power source modification 140 may include an adjustment of operating condition of power source 116 to optimal performance condition which may include ensuring an optimal temperature is reached. An "optimal temperature," for the purpose of this disclosure, is a temperature at which the power source can be recharged at a faster rate. In a non-limiting embodiment, the optimal temperature may be obtained from a database that associates a specific optimal temperature to the state of electric aircraft 120 that computing device 124 can best associate to. In another embodiment, the optimal temperature can be based on some optimal temperature from the database that computing device 120 has associated electric aircraft 124 or any electric aircraft with for a flight plan that best matches the data of flight plan 128, wherein the flight plan that best matches the data of flight plan 128 may have been previously stored by computing device 124 into the database. Alternatively or additionally, the optimal temperature may include any temperature for power source 116 that minimizes degradation of the power source 116. This may include modifying the temperature of power source 116 to best receive recharging that is not necessarily the fastest, but does result in minimizing degradation and/or maximizing the life cycle of power source 116. Persons skilled in the art, upon reviewing the entirety of this disclosure, will be aware of the various temperatures for a power source best suited for different priorities.

With continued reference to FIG. 1, in a non-limiting embodiment, power source modification 140 may include computing device 124 providing a command signal to the aircraft system to perform a modification action 136. For the purposes of this disclosure, a "modification action" is an act and/or process performed by an aircraft system or a power source in response to a received power source modification. In one or more non-limiting embodiments, power source modification 140 may include a temperature adjustment, voltage output adjustment, voltage input adjustment, current output adjustment, current input adjustment, any combination thereof, and the like. For example, and without limitation, power source modification 140 may be sent to a ground charging system and include instructions to increase SoC of power source 116 to, for example, 100%. As a result, charging system may produce a modification action, which includes providing electrical energy to power source 116 via, for example, a terminal of power source 116. In one or more non-limiting exemplary embodiments, the aircraft system may include an internal or external charging system, a thermal management system, such as a cooling system or a heating system, liquid cooling system, a battery ventilation, where ambient air is drawn about batteries then vented outboard (using an air conditioning duct), a heat pump, a heat sink, a puller fan, a compressor (used to supply bleed-air, which can be utilized in, for example, deicing and anti-icing of power source 116 and pneumatic starting of engines), a condenser, a humidifier, an extract fan, a ground cooling unit, a blower fan, or the like. For example, and without limitation, an aircraft system may include a block heater that may be commanded to perform a modification action including heating power source 116 to an optimal performance condition. In a non-limiting embodiment, power source modification 140 may be initiated automatically. For example and without limitation, as electric aircraft 120 is flying a flight plan and approaching a recharging landing pad to recharge its power source, the electric aircraft's avionics and sensors may detect descending movements of the electric aircraft and/or detect the electric aircraft's remaining distance to be traveled and initiate power source modification 140 before the electric aircraft lands at the destination. In another embodiment, a pilot of electric aircraft 120 and/or user of user device 144 may initiate power source modification 140 manually.

With continued reference to FIG. 1, a "user device," for the purpose of this disclosure, is any additional computing device, such as a mobile device, laptop, desktop computer, or the like. In a non-limiting embodiment, user device 144 may be a computer and/or smart phone operated by a user in a remote location. User device 144 may include, without limitation, a display in communication with computing device 124; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device 144 may include a graphical user interface configured to display any information from computing device 124 and/or any computing device. In a non-limiting embodiment, user device 144 may be utilized by a user located remotely from the electric aircraft in order to analyze data from the electric aircraft in a remote location. In a non-limiting embodiment, a user may utilize user device 144 to view a plurality of flight information and datum related to power modification 140 and/or preconditioning. This is so, at least in part, for users to have access to data collected by electric aircraft 120 instead of just the pilot of electric aircraft 120 and/or any user within electric aircraft 120 as it is flying in the air. In a non-limiting embodiment, apparatus 100 may include a software application for user device 144 and/or the pilot device that displays flight performance infographic 132, wherein a user may interact with the software application via user device 144 to manually initiate power source modification 140 and/or the preconditioning of power source 116. In another embodiment, user device 144 may be communicatively connected to electric aircraft 120 in which user device 144 may receive a manually entered instruction that includes a program that initiates power source modification 140. For example and without limitation, user device 144 may include some software that may be visually represented as a function of flight performance infographic 132 to support the manual initiation of power source modification 132 and/or trigger the initiation of power source modification 140. Flight performance infographic 132 may include buttons configured to manually initiate power source modification 140 as a function of it being pressed. Persons skilled in the art, upon reviewing the entirety of this disclosure, will be aware of the various embodiments of software in a device configured to trigger an action for purposes as described herein.

With continued reference to FIG. 1 in a non-limiting embodiment, a user may manually adjust the preconditioning parameters of power source 116 and/or electric aircraft 120. For example and without limitation, a user may modify power source modification 140 parameters. The user may not be satisfied or may be required to adjust preconditioning setups that were originally generated as a function of predicted power usage model 136 and/or the divergent element. The user may send various inputs via user device 144 operating the software application of apparatus 100. Persons skilled in the art, upon reviewing the entirety of this disclosure, will be aware of a separate computing device used for receiving and analyzing data from a flying electric aircraft for purposes as described herein.

Still referring to FIG. 1, power source modification 140 may be initiated automatically as a function of a proximity to a charging destination. As used in this disclosure, a "charging destination" is a location of an infrastructure configured to support the landing and recharging of electric aircrafts. The charging destination may include any recharging landing pad, recharging station, and the like thereof. Sensor 104 on electric aircraft 120 may detect some approaching distance to the charging destination during flight and automatically initiate power source modification 140 on power source 116 in advance to prepare it for charging. In another embodiment, computing device 124 may automatically initiate power source modification 140 once a certain amount of distance has been passed of flight plan 128. For example and without limitation, computing device 124 may detect 75% of the distance to the charging destination of flight plan 128 has been covered and initiate power source modification 140. A trigger point within flight plan 128 may be modified via computing device 124. Persons skilled in the art, upon reviewing the entirety of this disclosure, will be aware of the various embodiments of automatically initiating a preconditioning of a power source for purposes as described herein.

Figure 2:
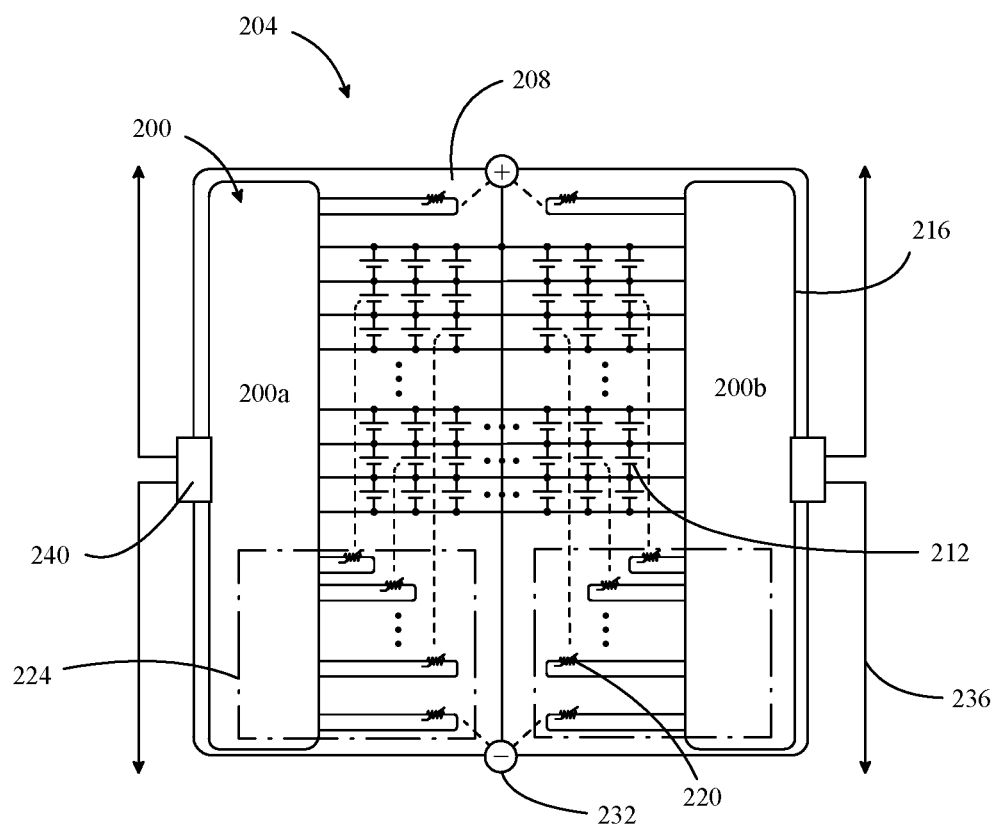
FIG. 2 is a block diagram of an exemplary embodiment of a module monitor unit in one or more aspect of the present disclosure.

Referring now to FIG. 2, an exemplary embodiment of a module monitor unit (MMU) 200 is presented in accordance with one or more embodiments of the present disclosure. In a non-limiting embodiment, power source 116 of electric aircraft 120 may include a batter pack of a plurality of battery packs, wherein each battery pack includes a plurality of battery modules 112. Each battery module 112 may include one or more MMU 200. In one or more embodiments, MMU 200 is configured to monitor an operating condition of a battery pack 204. For example, and without limitation, MMU 200 may monitor an operating condition of a battery module 208 and/or a battery cell 212 of battery pack 204. Battery pack 204 may be consistent with battery pack 116 in FIG. 1. In one or more embodiments, MMU 200 may be attached to battery module 208, as shown in FIG. 2. For example, and without limitation, MMU 200 may include a housing 216 that is attached to battery module 208, where circuitry of MMU 200 may be disposed at least partially therein, as discussed further in this disclosure. In other embodiments, MMU 200 may be remote to battery module 208. In one or more embodiments, housing 216 may include materials which possess characteristics suitable for thermal insulation, such as fiberglass, iron fibers, polystyrene foam, and thin plastic films, to name a few. Housing 216 may also include polyvinyl chloride (PVC), glass, asbestos, rigid laminate, varnish, resin, paper, Teflon, rubber, and mechanical lamina to physically isolate components of battery pack 204 from external components. In one or more embodiments, housing 216 may also include layers that separate individual components of MMU 200, which are discussed further below in this disclosure. As understood by one skilled in the art, housing 216 may be any shape or size suitable to attached to battery module 208 of battery pack 204.

Still referring to FIG. 2 In one or more embodiments, a plurality of MMUs 200 may be configured to monitor battery module 208 and/or battery cell 212. For instance, and without limitation, a first MMU 200a may be position at one end of battery module 208, and a second MMU 200b may be positioned at an opposing end of battery module 208. This arrangement may allow for redundancy in monitoring of battery cell 212. For example, and without limitation, if first MMU 200a fails, then second MMU 200b may continue to work properly and monitor the operating condition of each battery cell 212 of battery module 208. In one or more embodiments, MMU 200 may monitor the operating condition of a plurality of battery cells, as shown in FIG. 2. In one or more embodiments, MMU 200 is configured to detect a measurement parameter of battery module 208. For the purposes of this disclosure, a "measurement parameter" is detected electrical or physical input, characteristic, and/or phenomenon related to a state of battery pack 204. For example, and without limitation, a measurement parameter may be a temperature, a voltage, a current, a moisture level/humidity, a gas level, or the like, as discussed further in this disclosure. In one or more embodiments, MMU 200 is configured to perform load-sharing during the charging of battery pack 204. For instance, MMU 200 may regulate charge levels of battery cells 212. For example, charging of battery pack 204 may be shared throughout a plurality of battery cells 212 by directing energy through balance resistors and dissipating current through resistors as heat. For example, and without limitation, resistor may include a nonlinear resistor, such as a thermistor 220. In this manner, battery cells 212 may be charged evenly during recharging of battery pack 204 by, for example, a charging station or an electric grid. For example, and without limitation, battery cells with a lower amount of electrical energy will charge more than battery cells with a greater amount of energy.

With continued reference to FIG. 2, in one or more embodiments, MMU 200 is configured to monitor a temperature of battery module 208. For example, MMU 200 may include a sensor 224 configured to detect a temperature parameter of battery cell 212. For example, and without limitation, sensor 224 may include thermistor 220, which may be used to measure a temperature parameter of battery cell 212. As used in this disclosure, a thermistor includes a resistor having a resistance dependent on temperature. In one or more embodiments, sensor 224 may include circuitry configured to generate a measurement datum correlated to the detected measurement parameter, such as a temperature of battery cell 212 detected by thermistor 220. A thermistor may include metallic oxides, epoxy, glass, and the like. A thermistor may include a negative temperature coefficient (NTC) or a positive temperature coefficient (PTC). Thermistors may be beneficial do to being durable, compact, inexpensive, and relatively accurate. In one or more embodiments, a plurality of thermistors 220 may be used to provide redundant measuring of a state of battery cell 212, such as temperature. In other embodiments, MMU 200 may also include a resistance temperature detector (RTD), integrated circuit, thermocouple, thermometer, microbolometer, a thermopile infrared sensor, and/or other temperature and/or thermal sensors, as discussed further below in this disclosure. In one or more embodiments, thermistor 220 may detect a temperature of battery cell 212. Subsequently, MMU 200 may generate a sensor signal output containing information related to the detected temperature of battery cell 212. In one or more embodiments, sensor signal output may include measurement datum containing information representing a detected measurement parameter.

Still referring to FIG. 2, in one or more embodiments, sensor 224 may include a sensor suite 200 (shown in FIG. 2) or one or more individual sensors, which may include, but are not limited to, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, airspeed sensors, throttle position sensors, and the like. Sensor 224 may be a contact or a non-contact sensor. For example, and without limitation, sensor 224 may be connected to battery module 208 and/or battery cell 212. In other embodiments, sensor 224 may be remote to battery module and/or battery cell 212. Sensor 224 may be communicatively connected to controller 320 of PMU 312 (shown in FIG. 3) so that sensor 224 may transmit/receive signals to/from controller 320, respectively, as discussed below in this disclosure. Signals, such as signals of sensor 224 and controller 320, may include electrical, electromagnetic, visual, audio, radio waves, or another undisclosed signal type alone or in combination. In one or more embodiments, communicatively connecting is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit.

Figure 3:
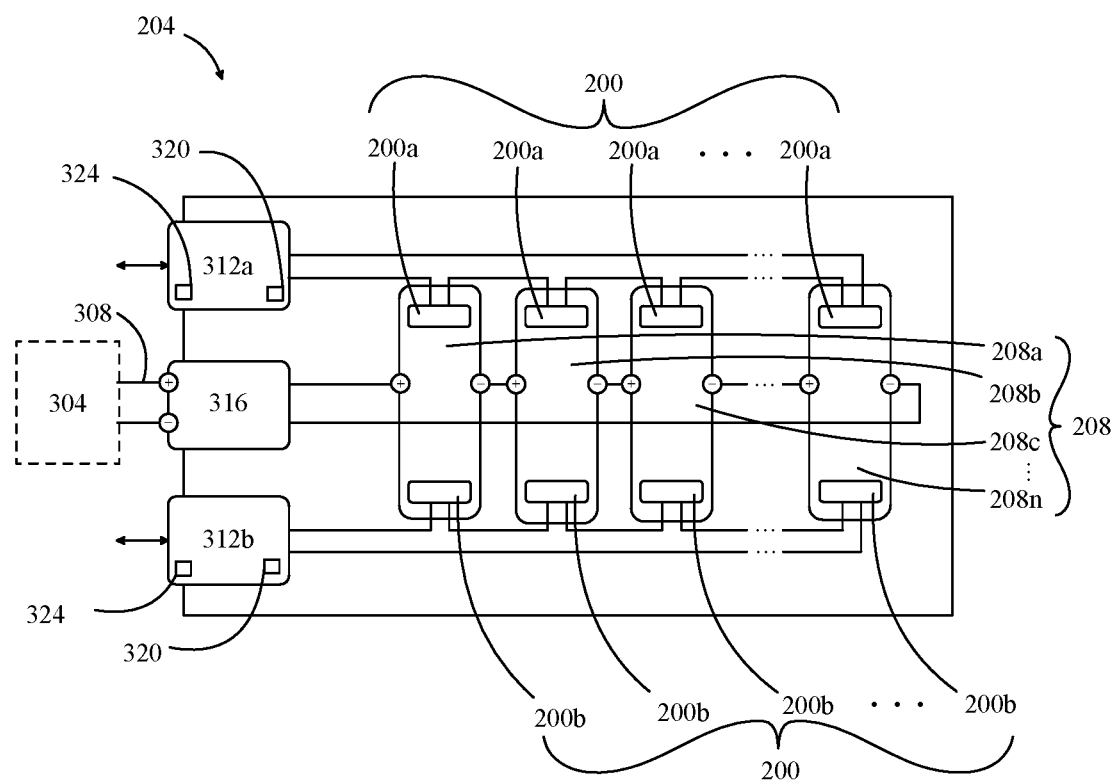
FIG. 3 is a block diagram of an exemplary embodiment of a battery pack in one or more aspects of the present disclosure.

In one or more embodiments, MMU 200 may include a control circuit that processes the received measurement datum from sensor 224, as shown in FIG. 3. In one or more embodiments, control circuit may be configured to perform and/or direct any actions performed by MMU 200 and/or any other component and/or element described in this disclosure. Control circuit may include any analog or digital control circuit, including without limitation a combinational and/or synchronous logic circuit, a processor, microprocessor, microcontroller, any combination thereof, or the like. In some embodiments, control circuit 228 may be integrated into MMU 200, as shown in FIG. 2. In other embodiments, control circuit 228 may be remote to MMU 200. In one or more nonlimiting exemplary embodiments, if measurement datum of a temperature of a battery module 208, such as at a terminal 232, is higher than a predetermined threshold, control circuit 228 may determine that the temperature of battery cell 212 indicates a critical event and thus is malfunctioning. For example, a high voltage (HV) electrical connection of battery module terminal 232 may be short circuiting. If control circuit 228 determines that a HV electrical connection is malfunctioning, control circuit 228 may terminate a physical and/or electrical communication of the HV electrical connection to prevent a dangerous or detrimental reaction, such as a short, that may result in an electrical shock, damage to battery pack 204, or even a fire. Thus, control circuit 228 may trip a circuit of battery pack 204 and terminate power flow through the faulty battery module 208 until the detected fault is corrected and/or the excessively high temperature is no longer detected. Temperature sensors, such as thermistor 220 may assist in the monitoring of a cell group's overall temperature, an individual battery cell's temperature, and/or battery module's temperature, as just described above.

In one or more embodiments, MMU 200 may not use software. For example, MMU 200 may not use software to improve reliability and durability of MMU 200. Rather, MMU 200 may be communicatively connected to a remote computing device, such as computing device 800 of FIG. 8. In one or more embodiments, MMU 200 may include one or more circuits and/or circuit elements, including without limitation a printed circuit board component, aligned with a first side of battery module 208 and the openings correlating to battery cells 212. In one or more embodiments, MMU 200 may be communicatively connected to a remote processing module, such as a controller. Controller may be configured to perform appropriate processing of detected temperature characteristics by sensor 224. In one or more embodiments, the controller may include an application-specific integrated circuit (ASIC), field-programmable gate array (FPGA), a central processing unit (CPU), readout integrated circuit (ROIC), or the like, and may be configured to perform characteristic processing to determine a temperature and/or critical event of battery module 208. In these and other embodiments, controller may operate in conjunction with other components, such as, a memory component, where a memory component includes a volatile memory and/or a non-volatile memory. In one or more embodiments, each MMU 200 may communicate with another MMU 200 and/or a controller via a communicative connection 236. Each MMU may use a wireless and/or wired connection to communicated with each other. For example, and without limitation, MMU 200a may communicate with an adjacent MMU 200a using an isoSPI connection 304 (shown in FIG. 3). As understood by one skilled in the art, and isoSPI connection may include a transformer to magnetically connect and electrically isolate a signal between communicating devices.

Now referring to FIG. 3, a battery pack with a battery management component 300 that utilizes MMU 200 for monitoring a status of battery pack is shown in accordance with one or more embodiments of the present disclosure. In one or more embodiments, the electric aircraft battery pack may be consistent with power source 116. In another embodiment, the battery pack may include a battery module 208, wherein the battery module is consistent with battery module 112, which is configured to provide energy to an electric aircraft 304 via a power supply connection 308. In a non-limiting embodiment, electric aircraft 304 may be consistent with electric aircraft 120. For the purposes of this disclosure, a "power supply connection" is an electrical and/or physical communication between a battery module 208 and electric aircraft 304 that powers electric aircraft 304 and/or electric aircraft subsystems for operation. In one or more embodiments, the battery pack may include a plurality of battery modules, such as modules 208a-n. For example, and without limitation, the battery pack may include fourteen battery modules. In one or more embodiments, each battery module 208a-n may include a battery cell 212 (shown in FIG. 2).

Still referring to FIG. 3, the battery pack may include a battery management component 220 (also referred to herein as a "management component"). In one or more embodiments, battery management component 300 may be integrated into the battery pack in a portion of the battery pack or a subassembly thereof. In an exemplary embodiment, and without limitation, management component 300 may be disposed on a first end of the battery pack. One of ordinary skill in the art will appreciate that there are various areas in and on a battery pack and/or subassemblies thereof that may include battery management component 300. In one or more embodiments, battery management component 300 may be disposed directly over, adjacent to, facing, and/or near a battery module and specifically at least a portion of a battery cell. In one or more embodiments, battery management component 300 includes module monitor unit (MMU) 200, a pack monitoring unit (PMU) 312, and a high voltage disconnect 316. In one or more embodiments, battery management component 300 may also include a sensor 224. For example, and without limitation, battery management component 300 may include a sensor suite 200 having a plurality of sensors, as discussed further in this disclosure, as shown in FIG. 2.

In one or more embodiments, MMU 200 may be mechanically connected and communicatively connected to battery module 208. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. In one or more embodiments, MMU 200 is configured to detect a measurement characteristic of battery module 208 of the battery pack. For the purposes of this disclosure, a "measurement characteristic" is detected electrical or physical input and/or phenomenon related to a condition state of the battery pack. A condition state may include detectable information related to, for example, a temperature, a moisture level, a humidity, a voltage, a current, vent gas, vibrations, chemical content, or other measurable characteristics of the battery pack, battery module 208, and/or battery cell 212. For example, and without limitation, MMU 200 may detect and/or measure a measurement characteristic, such as a temperature, of battery module 208. In one or more embodiments, a condition state of the battery pack may include a condition state of a battery module 208 and/or battery cell 212. In one or more embodiments, MMU 200 may include a sensor, which may be configured to detect and/or measure measurement characteristic. In a non-limiting embodiment, the sensor may be a device that is configured to detect an input and/or a phenomenon and transmit information and/or datum related to the detection, as discussed further below in this disclosure. Output signal may include a sensor signal, which transmits information and/or datum related to the sensor detection. A sensor signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio.

In one or more embodiments, MMU 200 is configured to transmit a measurement datum of battery module 208. MMU 200 may generate an output signal such as measurement datum that includes information regarding detected measurement characteristic. For the purposes of this disclosure, "measurement datum" is an electronic signal representing an information and/or a parameter of a detected electrical and/or physical characteristic and/or phenomenon correlated with a condition state of the battery pack. For example, measurement datum may include data of a measurement characteristic regarding a detected temperature of battery cell 212. In one or more embodiments, measurement datum may be transmitted by MMU 200 to PMU 312 so that PMU 312 may receive measurement datum, as discussed further in this disclosure. For example, MMU 200 may transmit measurement data to a controller 320 of PMU 312.

In one or more embodiments, MMU 200 may include a plurality of MMUs. For instance, and without limitation, each battery module 208a-n may include one or more MMUs 200. For example, and without limitation, each battery module 208a-n may include two MMUs 200a,b. MMUs 200a,b may be positioned on opposing sides of battery module 208. Battery module 208 may include a plurality of MMUs to create redundancy so that, if one MMU fails or malfunctions, another MMU may still operate properly. In one or more nonlimiting exemplary embodiments, MMU 200 may include mature technology so that there is a low risk. Furthermore, MMU 200 may not include software, for example, to avoid complications often associated with programming. MMU 200 is configured to monitor and balance all battery cell groups of the battery pack during charging of the battery pack. For instance, and without limitation, MMU 200 may monitor a temperature of battery module 208 and/or a battery cell of battery module 208. For example, and without limitation, MMU may monitor a battery cell group temperature. In another example, and without limitation, MMU 200 may monitor a terminal temperature to, for example, detect a poor HV electrical connection. In one or more embodiments, an MMU 200 may be indirectly connected to PMU 312. In other embodiments, MMU 200 may be directly connected to PMU 312. In one or more embodiments, MMU 200 may be communicatively connected to an adjacent MMU 200.

Still referring to FIG. 3, battery management component 300 includes a pack monitoring unit (PMU) 228 may be connected to MMU 200. In one or more embodiments, PMU 312 includes a controller 320, which is configured to receive measurement datum from MMU 200, as previously discussed in this disclosure. For example, PMU 312a may receive a plurality of measurement data from MMU 200a. Similarly, PMU 312b may receive a plurality of measurement data from MMU 200b. In one or more embodiments, PMU 312 may receive measurement datum from MMU 200 via communicative connections. For example, PMU 312 may receive measurement datum from MMU 200 via an isoSPI communications interface. In one or more embodiments, controller 320 of PMU 312 is configured to identify an operating of battery module 208 as a function of measurement datum. For the purposes of this disclosure, an "operating condition" is a state and/or working order of the battery pack and/or any components thereof. For example, and without limitation, an operating condition may include a state of charge (SoC), a depth of discharge (DoD), a temperature reading, a moisture level or humidity, a gas level, a chemical level, or the like. In one or more embodiments, controller 320 of PMU 312 is configured to determine a critical event element if operating condition is outside of a predetermined threshold (also referred to herein as a "predetermined threshold"). For the purposes of this disclosure, a "critical event element" is a failure and/or critical operating condition of a battery pack, battery cell, and/or battery module that may be harmful to the battery pack and/or electric aircraft 304. For instance, and without limitation, if an identified operating condition, such as a temperature of a battery cell 212 of the battery pack, does not fall within a predetermined threshold, such as a range of acceptable, operational temperatures of the battery cell, then a critical event element is determined by controller 320 of PMU 312. For example, and without limitation, PMU may be used measurement datum from MMU to identify a temperature of 95 degrees Fahrenheit for a battery cell. If the predetermined threshold is, for example, 75 to 90 degrees Fahrenheit, then the determined operating condition is outside of the predetermined threshold, such as exceeding the upper limit of 90 degrees Fahrenheit, and a critical event element is determined by controller 320. As used in this disclosure, a "predetermined threshold" is a limit and/or range of an acceptable quantitative value and/or representation related to a normal operating condition of a battery pack and/or components thereof. In one or more embodiments, an operating condition outside of the threshold is a critical operating condition, which triggers a critical event element, and an operating condition within the threshold is a normal operating condition that indicates that the battery pack is working properly. For example, and without limitation, if an operating condition of temperature exceeds a predetermined threshold, then battery pack is considered to be operating at a critical operating condition and may be at risk of overheating and experiencing a catastrophic failure.

In one or more embodiments, controller 320 of PMU 312 is configured to generate an action command if critical event element is determined by controller 320. Continuing the previously described example above, if an identified operating condition includes a temperature of 95 degrees Fahrenheit, which exceeds a predetermined threshold, then controller 320 may determine a critical event element indicating that the battery pack is working at a critical temperature level and at risk of catastrophic failure. In one or more embodiments, critical event elements may include high shock/drop, overtemperature, undervoltage, high moisture, contactor welding, and the like.

In one or more embodiments, controller 320 may include a computing device (as discussed in FIG. 8), a central processing unit (CPU), a microprocessor, a digital signal processor (DSP), an application specific integrated circuit (ASIC), a control circuit, a combination thereof, or the like. In one or more embodiments, output signals from various components of the battery pack may be analog or digital. Controller 320 may convert output signals from MMU 200 and/or sensor 224 to a usable form by the destination of those signals. The usable form of output signals from MMUs and/or sensors, through processor may be either digital, analog, a combination thereof, or an otherwise unstated form. Processing may be configured to trim, offset, or otherwise compensate the outputs of sensor. Based on MMU and/or sensor output, controller can determine the output to send to a downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In one or more embodiments, PMU 312 may run state estimation algorithms.

Still referring to FIG. 3, in one or more embodiments, MMU 200 may be implemented in battery management system 300 of the battery pack. MMU 200 may include sensor 224, as previously mentioned above in this disclosure. For instance, and without limitation, MMU 200 may include a plurality of sensors. For example, MMU 200 may include thermistors 220 to detect a temperature of a corresponding battery module 208 and/or battery cell 212. MMU 200 may include sensor 220 or a sensor suite that is configured to measure physical and/or electrical parameters of the battery pack of power source 116, such as without limitation temperature, voltage, current, orientation, or the like, of one or more battery modules and/or battery cells 212. MMU 200 may configured to generate a measurement datum of each battery cell 212, which a control circuit may ultimately use to determine a failure within battery module 208 and/or battery cell 212, such as a critical event element. Cell failure may be characterized by a spike in temperature and MMU 200 may be configured to detect that increase, which in turn, PMU 312 uses to determine a critical event element and generate signals, to disconnect a power supply connection between the electric aircraft and battery cell 212 and to notify users, support personnel, safety personnel, maintainers, operators, emergency personnel, aircraft computers, or a combination thereof. In one or more embodiments, measurement data of MMU may be stored in memory component 324.

Still referring to FIG. 3, battery management component 300 may include high voltage disconnect 232, which is communicatively connected to battery module 208, wherein high voltage disconnect 232 is configured to terminate power supply connection 212 between battery module 208 and electric aircraft 304 in response to receiving action command from PMU 312. PMU 312 may be configured to determine a critical event element, such as high shock/drop, overtemperature, undervoltage, contactor welding, and the like. High voltage disconnect 232 is configured to receive action command generated by PMU 312 and lock out the battery pack of power source 116 for maintenance in response to received action command. In one or more embodiments, PMU 312 may create a lockout flag, which may be saved across reboots. A lockout flag may include an indicator alerting a user of termination of power supply connection 212 by high voltage disconnect 232. For instance, and without limitation, a lockout flag may be saved in a database od PMU 312 so that, despite rebooting the battery pack of power source 116 or complete loss of power of the battery pack, power supply connection remains terminated and an alert regarding the termination remains. In one or more embodiments, lockout flag cannot be removed until a critical event element is no longer determined by controller 320. For, example, PMU 312 may be continuously updating an operating condition and determining if operating condition is outside of a predetermined threshold. In one or more embodiments, lockout flag may include an alert on a graphic user interface of, for example, a remote computing device, such as a mobile device, tablet, laptop, desktop and the like. In other embodiments, lockout flag may be indicated to a user via an illuminated LED that is remote or locally located on the battery pack. In one or more embodiments, PMU 312 may include control of cell group balancing via MMUs, control of contactors (high voltage connections, etc.) control of welding detection, control of pyro fuses, and the like.

In one or more embodiments, battery management component 300 may include a plurality of PMUs 312. For instance, and without limitation, battery management component 300 may include a pair of PMUs. For example, and without limitation, battery management component 300 may include a first PMU 312a and a second PMU 312b, which are each disposed in or on the battery pack of power source 116 and may be physically isolated from each other. "Physical isolation", for the purposes of this disclosure, refer to a first system's components, communicative connection, and any other constituent parts, whether software or hardware, are separated from a second system's components, communicative coupling, and any other constituent parts, whether software or hardware, respectively. Continuing in reference to the nonlimiting exemplary embodiment, first PMU 312a and second PMU 312b may perform the same or different functions. For example, and without limitation, the first and second PMUs 312a,b may perform the same, and therefore, redundant functions. Thus, if one PMU 312a/b fails or malfunctions, in whole or in part, the other PMU 312b/a may still be operating properly and therefore battery management component 300 may still operate and function properly for the battery pack. One of ordinary skill in the art would understand that the terms "first" and "second" do not refer to either PMU as primary or secondary. In non-limiting embodiments, the first and second PMUs 312a,b, due to their physical isolation, may be configured to withstand malfunctions or failures in the other system and survive and operate. Provisions may be made to shield first PMU 312a from PMU 312b other than physical location, such as structures and circuit fuses. In non-limiting embodiments, first PMU 312a, second PMU 312b, or subcomponents thereof may be disposed on an internal component or set of components within the battery pack, such as on battery module sense board, as discussed further below in this disclosure.

Still referring to FIG. 3, first PMU 312a may be electrically isolated from second PMU 312b. "Electrical isolation", for the purposes of this disclosure, refer to a first system's separation of components carrying electrical signals or electrical energy from a second system's components. First PMU 312a may suffer an electrical catastrophe, rendering it inoperable, and due to electrical isolation, second PMU 312b may still continue to operate and function normally, allowing for continued management of the battery pack of electric aircraft 204. Shielding such as structural components, material selection, a combination thereof, or another undisclosed method of electrical isolation and insulation may be used, in nonlimiting embodiments. For example, and without limitation, a rubber or other electrically insulating material component may be disposed between electrical components of first and second PMUs 312a,b, preventing electrical energy to be conducted through it, isolating the first and second PMUs 312a,b form each other.

With continued reference to FIG. 3, battery management component 300 may include memory component 324, as previously mentioned above in this disclosure. In one or more embodiments, memory component 324 may be configured to store datum related to the battery pack, such as data related to battery modules 208a-n and/or battery cells 212. For example, and without limitation, memory component 324 may store sensor datum, measurement datum, operation condition, critical event element, lockout flag, and the like. Memory component 324 may include a database. Memory component 324 may include a solid-state memory or tape hard drive. Memory component 324 may be communicatively connected to PMU 312 and may be configured to receive electrical signals related to physical or electrical phenomenon measured and store those electrical signals as battery module data. Alternatively, memory component 324 may be a plurality of discrete memory components that are physically and electrically isolated from each other. One of ordinary skill in the art would understand the virtually limitless arrangements of data stores with which battery pack of power source 116 could employ to store battery pack data.

Figure 4:
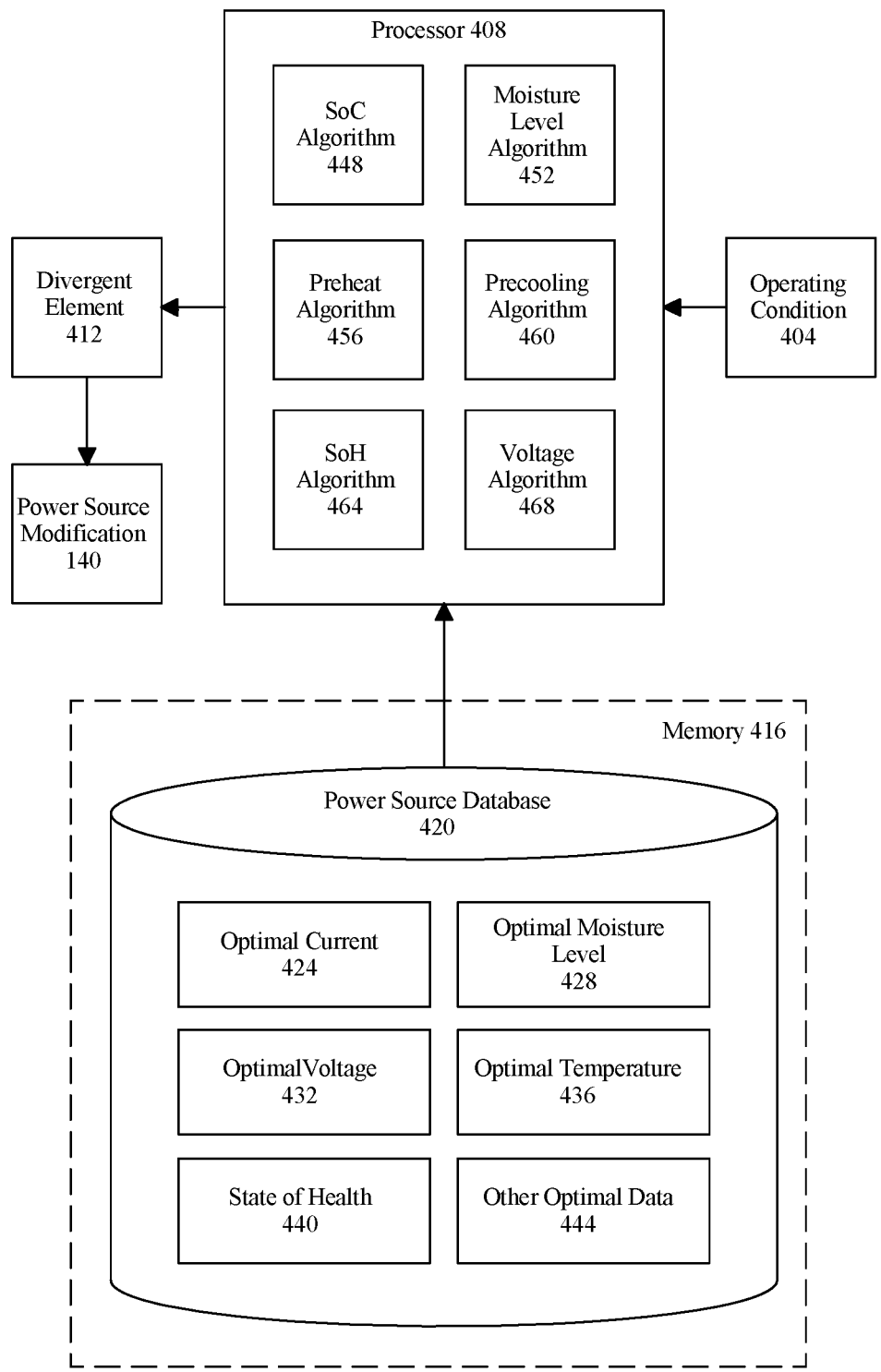
FIG. 4 is a block diagram of an exemplary embodiment of a divergence machine-learning model and a power source database in accordance with aspects of the invention thereof.

Now referring to FIG. 4, an exemplary embodiment of divergence machine-learning model 408 and power source database 420 of computing device 116 are illustrated. Power source database 420 may include one or more optimal performance conditions of one or more operating states of a power source. For example, and without limitation, power source database may include an optimal current 424, an optimal moisture level 428, an optimal voltage 432, an optimal temperature 436, an optimal SoC, an optimal SoH 440, or other optimal data 444. Power source database 420 may be programmed into computing device 124 or inputted by a user. Power source database 420 may also change based on a prior use element. For example, and without limitation, a previous identification of one or more optimized functions, states, and/or outputs of power source 116 may be considered prior use elements. As understood by one skilled in the art, optimal performance condition 416 may include a plurality of optimal operating conditions that maximize one or more functions, states, and/or outputs of power source 116. For example, optimal performance condition 416 may include a plurality of optimal operating conditions for operating states such as, but not limited to, temperature, voltage, current, and the like, as discussed above in this disclosure.

Still referring to FIG. 4, as understood by one skilled in the art, an operating condition 404 may include one or more operating conditions. For instance, and without limitation, operating condition may include condition datum 108 from one or more sensors related to one or more operating states. For example, and without limitation, condition datum 108 may include condition data from a temperature sensor, a voltage sensor, and a current sensor. Condition data may then be used to determine operating conditions of operating states for, for example, temperature and SoC of power source 116. In one or more embodiment, operating condition 404 may be determined using one or more machine-learning models, such as, for example, an operating condition machine-learning model.

With continued reference to FIG. 4, in one or more embodiments, determining divergent element 412 may include using one or more machine-learning models, such as exemplary divergence machine-learning model 408. A machine-learning model may include one or more supervised machine-learning models, unsupervised machine-learning models, and the like thereof. For example, and without limitation, flight controller may be configured to train a divergence machine-learning model using training data, where the training data includes a plurality of performance condition elements correlated with operating condition elements. In one or more non-limiting exemplary embodiments, machine-learning model 408 may include various algorithms and/or functions used to relate operating condition 404 and optimal performance condition 416 to determine if there is a divergent element 412 of an operating state of power source 116. For example, and without limitation, divergence machine-learning model 408 may use functions such as a SoC function 448, a moisture-level function 452, a preheat function 456, a precooling function 460, a SoH function 464, a voltage function 468, or other functions. If there is a divergent element, then power source modification 140 may be initiated, as discussed above in this disclosure.

Still referring to FIG. 4, in one or more embodiments, and without limitation, divergent element 412 may be determined as a function of optimal performance condition 416 and operating condition 404. For example, and without limitation, computing device 116 may be configured to train divergence machine-learning model 408 using condition training data, which includes a plurality of performance condition elements correlated with operating condition elements 416. Computing device 124 may then be configured to generate divergent element 412 as a function of divergence machine-learning model 408. For example, and without limitation, divergence machine-learning model 408 may relate optimal performance condition 416 with one or more operating conditions to determine a corresponding divergent element and magnitude of divergence.

Still referring to FIG. 4, computing device 124 may be configured to display divergent element 412 and receive a user input for power source modification 140. In one or more embodiments, graphic user interface may notify a user of how much time is required to remedy one or more determined divergent elements 412. For example, and without limitation, a battery status for one or more operating states of power source 116 may be provided on a display of aircraft 120 or via an indicator, such as an LED indicator. In one or more embodiments, sensor 108 may be instructed by computing device 116 to provide continuous condition datum 108. In other embodiments, sensor 108 may only be instructed to provide condition datum 108 upon request, such as a user request or automated request initiated by powering of avionic systems of aircraft 120. Computing device 124 may request interrogation of specific operating states of power source 116 or may request condition datum 108 related to all operating states of power source 116. In other embodiments, preconditioning of power source 116 may be scheduled, such as using a timer. Preconditioning of power source 116 may occur prior to takeoff or after landing.

Figure 5:
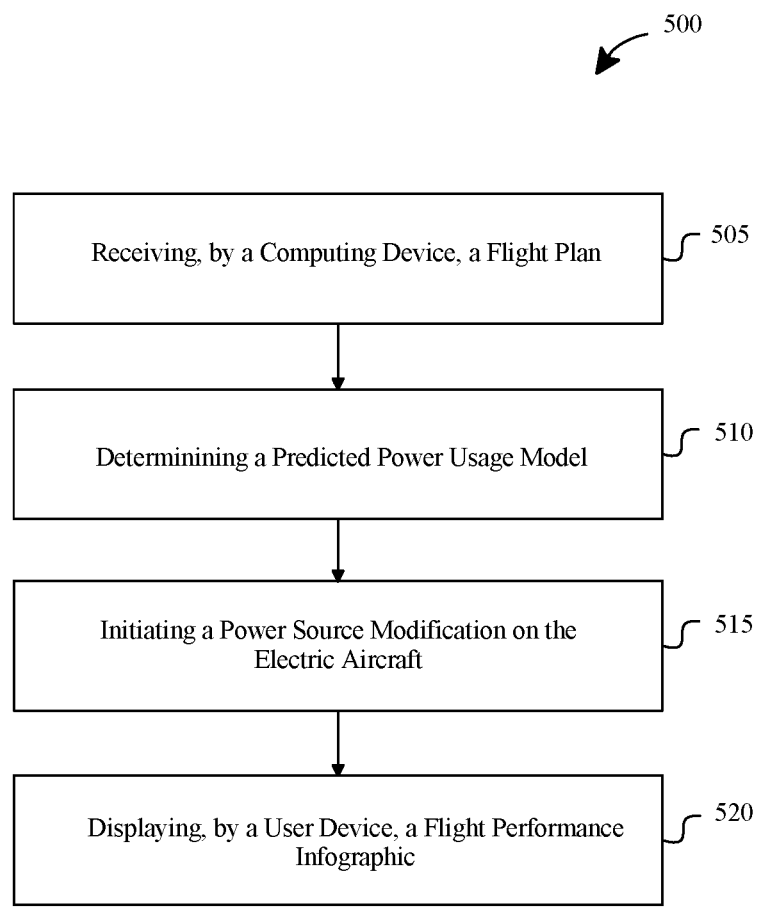
FIG. 5 is flow diagram of an exemplary embodiment of a method for preconditioning a power source of an electric aircraft.

Now referring to FIG. 5, a flow diagram of an exemplary embodiment of a method 500 for preconditioning a power source of an electric aircraft is provided. Method 500, at step 505, may include receiving, by a computing device, a flight plan. The flight plan may be consistent with any flight plan as described herein. The computing device may include any computing device as described herein. In a non-limiting embodiment, receiving the flight plan may include transferring signals including the flight plan. For example and without limitation, method 500 may include receiving the flight plan from an air traffic control authority. In a non-limiting embodiment, method 500 may include receiving a condition datum from a power source of an electric aircraft. The power source may include any power source as described herein. The electric aircraft may be consistent with any electric aircraft as described herein. In another non-limiting embodiment, the computing device may receive any datum as a function of one more more physical CAN bus units configured to receive signals that include any datum as described herein.

Still referring to FIG. 5, method 500 may include detecting the condition datum of an operating component of the power source by a sensor. The operating component may include any operating component as described herein. The sensor may include a plurality of sensors, wherein the sensor may be consistent with any sensor as described herein. In a non-limiting embodiment, method 500 may further include obtaining an optimal performance condition of the power source. The optimal condition may include any optimal condition as described herein. In a non-limiting embodiment, the optimal condition may include an optimal temperature for the power source to reach and/or maintain.

With continued reference to FIG. 5, method 500, at step 510, may include determining a predicted power usage model. In a non-limiting embodiment, method 500, at step 510, may include determining the predicted power usage model as a function of the flight plan. The predicted power usage model may be consistent with any predicted power usage model as described herein. In a non-limiting embodiment, method 500 may include operating on the computing device a flight simulator and simulating a virtual representation of the electric aircraft and its power source. The flight simulator may include any flight simulator as described herein. The virtual representation may include any virtual representation as described herein. In a non-limiting embodiment, method 500 may further include identifying an operating condition of an operating component of the power source as a function of the condition datum. The operating condition may be consistent with any operating condition as described herein. Method 500 may further include determining a divergent element as a function of the optimal performance condition and the operating condition of the power source. The divergent element may be consistent with any divergent element as described herein. In a non-limiting embodiment, determining the divergent condition may include using a divergence machine-learning model. The divergence machine-learning model may be consistent with any divergence machine-learning model as described herein.

Still referring to FIG. 5, method 500, at step 515, may include initiating a power source modification on the electric aircraft as a function of the predicted power usage model. The power source modification may be consistent with any power source modification as described herein. In a non-limiting embodiment, initiating the power source modification may be done automatically in the event the electric aircraft is approaching its destination. In a non-limiting embodiment, method 500 may include initiating the power source modification on the electric aircraft as a function of the divergent element. In a non-limiting embodiment, the power source modification may be initiated manually by a pilot or user operating a pilot device or user device, respectively.

With continued reference to FIG. 5, method 500, at step 520, may include displaying, by a user device, a flight performance infographic as a function of the predicted power usage model. The flight performance infographic may be consistent with any flight performance infographic as described herein. In a non-limiting embodiment, the flight performance infographic may contain the predicted power usage model. In another non-limiting embodiment, the flight performance infographic may include a plurality of metrics related to the electric aircraft and its power source. In another non-limiting embodiment, generating the flight performance infographic metrics may include generating predicted models and/or predicting metrics related to power usage and power charging. The user device may be consistent with any user device as described herein. In a non-limiting embodiment, method 500 may include utilizing the user device to view and manipulate the power source modification. In a non-limiting embodiment, the power source modification may include preconditioning operations and/or requirements. Method 500 may include viewing a plurality of parameters describing the preconditioning operations and/or requirements, wherein the user and/or pilot may input preferences to the preconditioning parameters and modify the power source modifications.

With continued reference to FIG. 5, method 500, at step 520, may include displaying, by a user device, a flight performance infographic as a function of the predicted power usage model. The flight performance infographic may be consistent with any flight performance infographic as described herein. In a non-limiting embodiment, the flight performance infographic may contain the predicted power usage model. In another non-limiting embodiment, the flight performance infographic may include a plurality of metrics related to the electric aircraft and its power source. In another non-limiting embodiment, generating the flight performance infographic metrics may include generating predicted models and/or predicting metrics related to power usage and power charging. The user device may be consistent with any user device as described herein. In a non-limiting embodiment, method 500 may include utilizing the user device to view and manipulate the power source modification. In a non-limiting embodiment, the power source modification may include preconditioning operations and/or requirements. Method 500 may include viewing a plurality of parameters describing the preconditioning operations and/or requirements, wherein the user and/or pilot may input preferences to the preconditioning parameters and modify the power source modifications.

Figure 6:
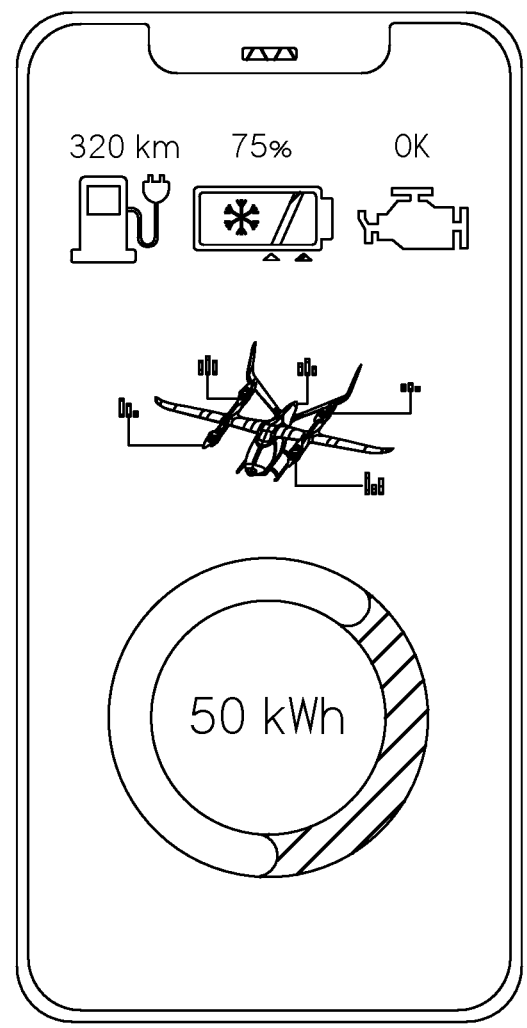
FIG. 6 is an illustration of an exemplary embodiment of a software application for preconditioning a power source of an electric aircraft on a mobile device.

Referring now to FIG. 6, an illustration of an exemplary embodiment of a software application for preconditioning a power source of an electric aircraft on a mobile device. The mobile device may include any smartphone, laptop, computer, and the like thereof. In a non-limiting embodiment, the mobile device may be configured to run any software application that provides visual information regarding the preconditioning and/or power source modification of the power source of the electric aircraft. For example and without limitation, the software application operating on the mobile device may display a visual infographic describing flight information and metrics related to the electric aircraft and the preconditioning of the power source of the electric aircraft. Metrics may include remaining distance to destination, remaining range until recharge, remaining battery percentage, optimal temperature the power source is to reach, operational status of a plurality of subsystems of the electric aircraft, and the like thereof. In another non-limiting embodiment, the software application may be communicatively connected to the power source and/or electric aircraft, in which a user may press or tap a plurality of buttons to initiate the power modification and/or preconditioning. The user may modify specific metrics and/or parameters related to the preconditioning of the power source of the electric aircraft.

Figure 7:
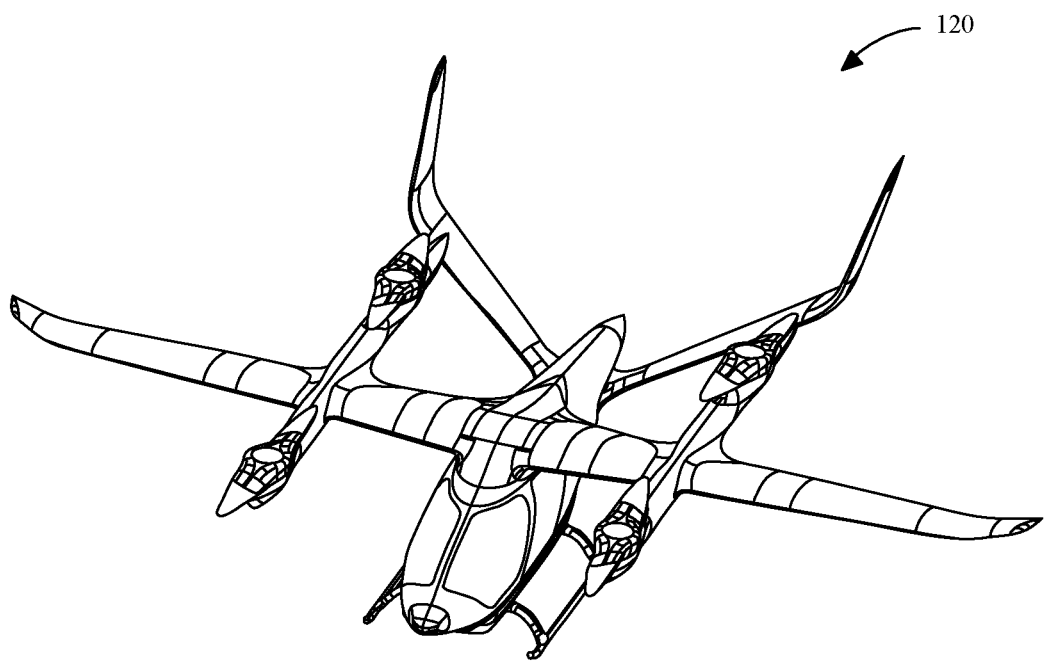
FIG. 7 is a diagrammatic representation illustrating an isometric view of an electric aircraft in accordance with aspects of the invention thereof.

Now referring to FIG. 7, an exemplary embodiment of aircraft 120 is illustrated in accordance with one or more embodiments of the present disclosure. An "aircraft", as described herein, is a vehicle that travels through the air. As a non-limiting example, aircraft may include airplanes, helicopters, airships, blimps, gliders, paramotors, drones, and the like. Additionally or alternatively, an aircraft may include one or more electric aircrafts and/or hybrid electric aircrafts. For example, and without limitation, aircraft 120 may include an electric vertical takeoff and landing (eVTOL) aircraft, as shown in FIG. 7. As used herein, a vertical takeoff and landing (eVTOL) aircraft is an electrically powered aircraft that can take off and land vertically. An eVTOL aircraft may be capable of hovering. In order, without limitation, to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight is where the aircraft generates lift and propulsion by way of one or more powered rotors coupled with an engine, such as a "quad copter," helicopter, or other vehicle that maintains its lift primarily using downward thrusting propulsors. Fixed-wing flight, as described herein, flight using wings and/or foils that generate life caused by an aircraft's forward airspeed and the shape of the wings and/or foils, such as in airplane-style flight.

Figure 8:
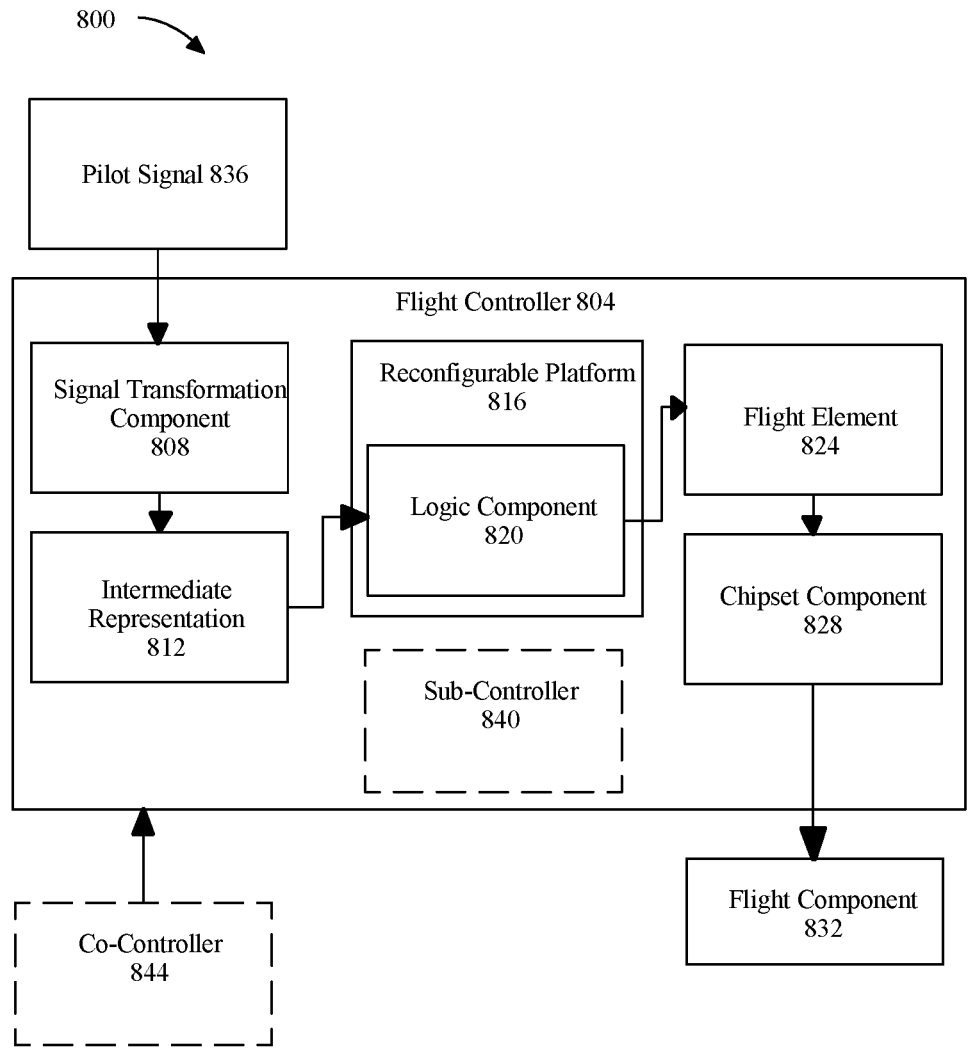
FIG. 8 is a block diagram of a flight controller in accordance with aspects of the invention thereof.

Now referring to FIG. 8, an exemplary embodiment 800 of a flight controller 804 is illustrated. As used in this disclosure a "flight controller" is a computing device or a plurality of computing devices dedicated to data storage, security, distribution of traffic for load balancing, and flight instruction. Flight controller 804 may include and/or communicate with any computing device as described in this disclosure, including without limitation a microcontroller, microprocessor, digital signal processor (DSP) and/or system on a chip (SoC) as described in this disclosure. Further, flight controller 804 may include a single computing device operating independently, or may include two or more computing device operating in concert, in parallel, sequentially or the like; two or more computing devices may be included together in a single computing device or in two or more computing devices. In embodiments, flight controller 804 may be installed in an aircraft, may control the aircraft remotely, and/or may include an element installed in the aircraft and a remote element in communication therewith.

In an embodiment, and still referring to FIG. 8, flight controller 804 may include a signal transformation component 808. As used in this disclosure a "signal transformation component" is a component that transforms and/or converts a first signal to a second signal, wherein a signal may include one or more digital and/or analog signals. For example, and without limitation, signal transformation component 808 may be configured to perform one or more operations such as preprocessing, lexical analysis, parsing, semantic analysis, and the like thereof. In an embodiment, and without limitation, signal transformation component 808 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 808 may include transforming one or more low-level languages such as, but not limited to, machine languages and/or assembly languages. For example, and without limitation, signal transformation component 808 may include transforming a binary language signal to an assembly language signal. In an embodiment, and without limitation, signal transformation component 808 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 8, signal transformation component 808 may be configured to optimize an intermediate representation 812. As used in this disclosure an "intermediate representation" is a data structure and/or code that represents the input signal. Signal transformation component 808 may optimize intermediate representation as a function of a data-flow analysis, dependence analysis, alias analysis, pointer analysis, escape analysis, and the like thereof. In an embodiment, and without limitation, signal transformation component 808 may optimize intermediate representation 812 as a function of one or more inline expansions, dead code eliminations, constant propagation, loop transformations, and/or automatic parallelization functions. In another embodiment, signal transformation component 808 may optimize intermediate representation as a function of a machine dependent optimization such as a peephole optimization, wherein a peephole optimization may rewrite short sequences of code into more efficient sequences of code. Signal transformation component 808 may optimize intermediate representation to generate an output language, wherein an "output language," as used herein, is the native machine language of flight controller 804. For example, and without limitation, native machine language may include one or more binary and/or numerical languages.

In an embodiment, and without limitation, signal transformation component 808 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q–k–1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 8, flight controller 804 may include a reconfigurable hardware platform 816. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 816 may be reconfigured to enact any algorithm and/or algorithm selection process received from another computing device and/or created using machine-learning processes.

Still referring to FIG. 8, reconfigurable hardware platform 816 may include a logic component 820. As used in this disclosure a "logic component" is a component that executes instructions on output language. For example, and without limitation, logic component may perform basic arithmetic, logic, controlling, input/output operations, and the like thereof. Logic component 820 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 820 may be organized according to Von Neumann and/or Harvard architecture as a non-limiting example. Logic component 820 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 820 may include one or more integrated circuit microprocessors, which may contain one or more central processing units, central processors, and/or main processors, on a single metal-oxide-semiconductor chip. Logic component 820 may be configured to execute a sequence of stored instructions to be performed on the output language and/or intermediate representation 812. Logic component 820 may be configured to fetch and/or retrieve the instruction from a memory cache, wherein a "memory cache," as used in this disclosure, is a stored instruction set on flight controller 804. Logic component 820 may be configured to decode the instruction retrieved from the memory cache to opcodes and/or operands. Logic component 820 may be configured to execute the instruction on intermediate representation 812 and/or output language. For example, and without limitation, logic component 820 may be configured to execute an addition operation on intermediate representation 812 and/or output language.

In an embodiment, and without limitation, logic component 820 may be configured to calculate a flight element 824. As used in this disclosure a "flight element" is an element of datum denoting a relative status of aircraft. For example, and without limitation, flight element 824 may denote one or more torques, thrusts, airspeed velocities, forces, altitudes, groundspeed velocities, directions during flight, directions facing, forces, orientations, and the like thereof. For example, and without limitation, flight element 824 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 824 may denote that aircraft is following a flight path accurately and/or sufficiently.

Still referring to FIG. 8, flight controller 804 may include a chipset component 828. As used in this disclosure a "chipset component" is a component that manages data flow. In an embodiment, and without limitation, chipset component 828 may include a northbridge data flow path, wherein the northbridge dataflow path may manage data flow from logic component 820 to a high-speed device and/or component, such as a RAM, graphics controller, and the like thereof. In another embodiment, and without limitation, chipset component 828 may include a southbridge data flow path, wherein the southbridge dataflow path may manage data flow from logic component 820 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 828 may manage data flow between logic component 820, memory cache, and a flight component 832. As used in this disclosure a "flight component" is a portion of an aircraft that can be moved or adjusted to affect one or more flight elements. For example, flight component 832 may include a component used to affect the aircrafts' roll and pitch which may comprise one or more ailerons. As a further example, flight component 832 may include a rudder to control yaw of an aircraft. In an embodiment, chipset component 828 may be configured to communicate with a plurality of flight components as a function of flight element 824. For example, and without limitation, chipset component 828 may transmit to an aircraft rotor to reduce torque of a first lift propulsor and increase the forward thrust produced by a pusher component to perform a flight maneuver.

In an embodiment, and still referring to FIG. 8, flight controller 804 may be configured generate an autonomous function. As used in this disclosure an "autonomous function" is a mode and/or function of flight controller 804 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 824. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 804 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 804 will control the ailerons and/or rudders. As used in this disclosure "non-autonomous mode" is a mode that denotes a pilot will control aircraft and/or maneuvers of aircraft in its entirety.

In an embodiment, and still referring to FIG. 8, flight controller 804 may generate autonomous function as a function of an autonomous machine-learning model. As used in this disclosure an "autonomous machine-learning model" is a machine-learning model to produce an autonomous function output given flight element 824 and a pilot signal 836 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 836 may denote that a pilot is controlling and/or maneuvering ailerons, wherein the pilot is not in control of the rudders and/or propulsors. In an embodiment, pilot signal 836 may include an implicit signal and/or an explicit signal. For example, and without limitation, pilot signal 836 may include an explicit signal, wherein the pilot explicitly states there is a lack of control and/or desire for autonomous function. As a further non-limiting example, pilot signal 836 may include an explicit signal directing flight controller 804 to control and/or maintain a portion of aircraft, a portion of the flight plan, the entire aircraft, and/or the entire flight plan. As a further non-limiting example, pilot signal 836 may include an implicit signal, wherein flight controller 804 detects a lack of control such as by a malfunction, torque alteration, flight path deviation, and the like thereof. In an embodiment, and without limitation, pilot signal 836 may include one or more explicit signals to reduce torque, and/or one or more implicit signals that torque may be reduced due to reduction of airspeed velocity. In an embodiment, and without limitation, pilot signal 836 may include one or more local and/or global signals. For example, and without limitation, pilot signal 836 may include a local signal that is transmitted by a pilot and/or crew member. As a further non-limiting example, pilot signal 836 may include a global signal that is transmitted by air traffic control and/or one or more remote users that are in communication with the pilot of aircraft. In an embodiment, pilot signal 836 may be received as a function of a tri-state bus and/or multiplexor that denotes an explicit pilot signal should be transmitted prior to any implicit or global pilot signal.

Still referring to FIG. 8, autonomous machine-learning model may include one or more autonomous machine-learning processes such as supervised, unsupervised, or reinforcement machine-learning processes that flight controller 804 and/or a remote device may or may not use in the generation of autonomous function. As used in this disclosure "remote device" is an external device to flight controller 804. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 8, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 804 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 8, flight controller 804 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 804. Remote device and/or FPGA may transmit a signal, bit, datum, or parameter to flight controller 804 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example, a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 804 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 8, flight controller 804 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 8, flight controller 804 may include, but is not limited to, for example, a cluster of flight controllers in a first location and a second flight controller or cluster of flight controllers in a second location. Flight controller 804 may include one or more flight controllers dedicated to data storage, security, distribution of traffic for load balancing, and the like. Flight controller 804 may be configured to distribute one or more computing tasks as described below across a plurality of flight controllers, which may operate in parallel, in series, redundantly, or in any other manner used for distribution of tasks or memory between computing devices. For example, and without limitation, flight controller 804 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 8, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 832. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 8, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 804. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 812 and/or output language from logic component 820, wherein output language may include one or more analog-to-digital conversions, low bit rate transmissions, message encryptions, digital signals, binary signals, logic signals, analog signals, and the like thereof described above in detail.

Still referring to FIG. 8, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 8, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 8, flight controller 804 may also be implemented using a "shared nothing" architecture in which data is cached at the worker, in an embodiment, this may enable scalability of aircraft and/or computing device. Flight controller 804 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 8, flight controller may include a sub-controller 840. As used in this disclosure a "sub-controller" is a controller and/or component that is part of a distributed controller as described above; for instance, flight controller 804 may be and/or include a distributed flight controller made up of one or more sub-controllers. For example, and without limitation, sub-controller 840 may include any controllers and/or components thereof that are similar to distributed flight controller and/or flight controller as described above. Sub-controller 840 may include any component of any flight controller as described above. Sub-controller 840 may be implemented in any manner suitable for implementation of a flight controller as described above. As a further non-limiting example, sub-controller 840 may include one or more processors, logic components and/or computing devices capable of receiving, processing, and/or transmitting data across the distributed flight controller as described above. As a further non-limiting example, sub-controller 840 may include a controller that receives a signal from a first flight controller and/or first distributed flight controller component and transmits the signal to a plurality of additional sub-controllers and/or flight components.

Still referring to FIG. 8, flight controller may include a co-controller 844. As used in this disclosure a "co-controller" is a controller and/or component that joins flight controller 804 as components and/or nodes of a distributer flight controller as described above. For example, and without limitation, co-controller 844 may include one or more controllers and/or components that are similar to flight controller 804. As a further non-limiting example, co-controller 844 may include any controller and/or component that joins flight controller 804 to distributer flight controller. As a further non-limiting example, co-controller 844 may include one or more processors, logic components and/or computing devices capable of receiving, processing, and/or transmitting data to and/or from flight controller 804 to distributed flight control system. Co-controller 844 may include any component of any flight controller as described above. Co-controller 844 may be implemented in any manner suitable for implementation of a flight controller as described above.

In an embodiment, and with continued reference to FIG. 8, flight controller 804 may be designed and/or configured to perform any method, method step, or sequence of method steps in any embodiment described in this disclosure, in any order and with any degree of repetition. For instance, flight controller 804 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
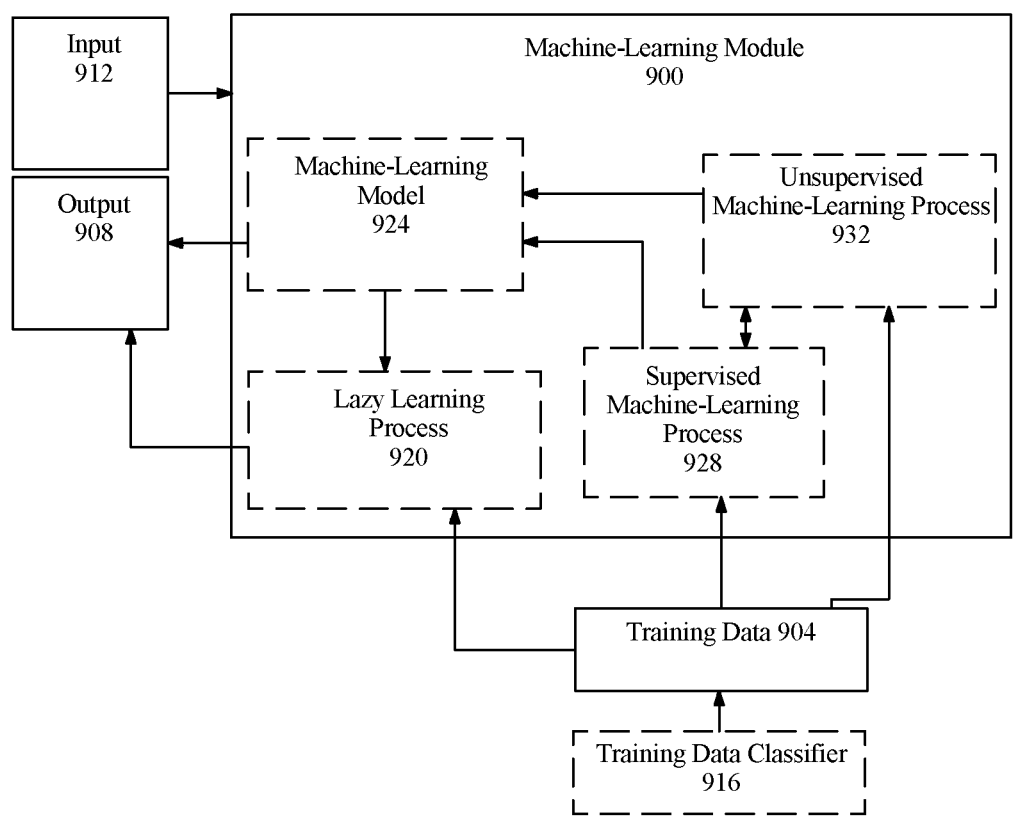
FIG. 9 is a block diagram of an exemplary machine-learning model.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any inputs as described above as inputs, any outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
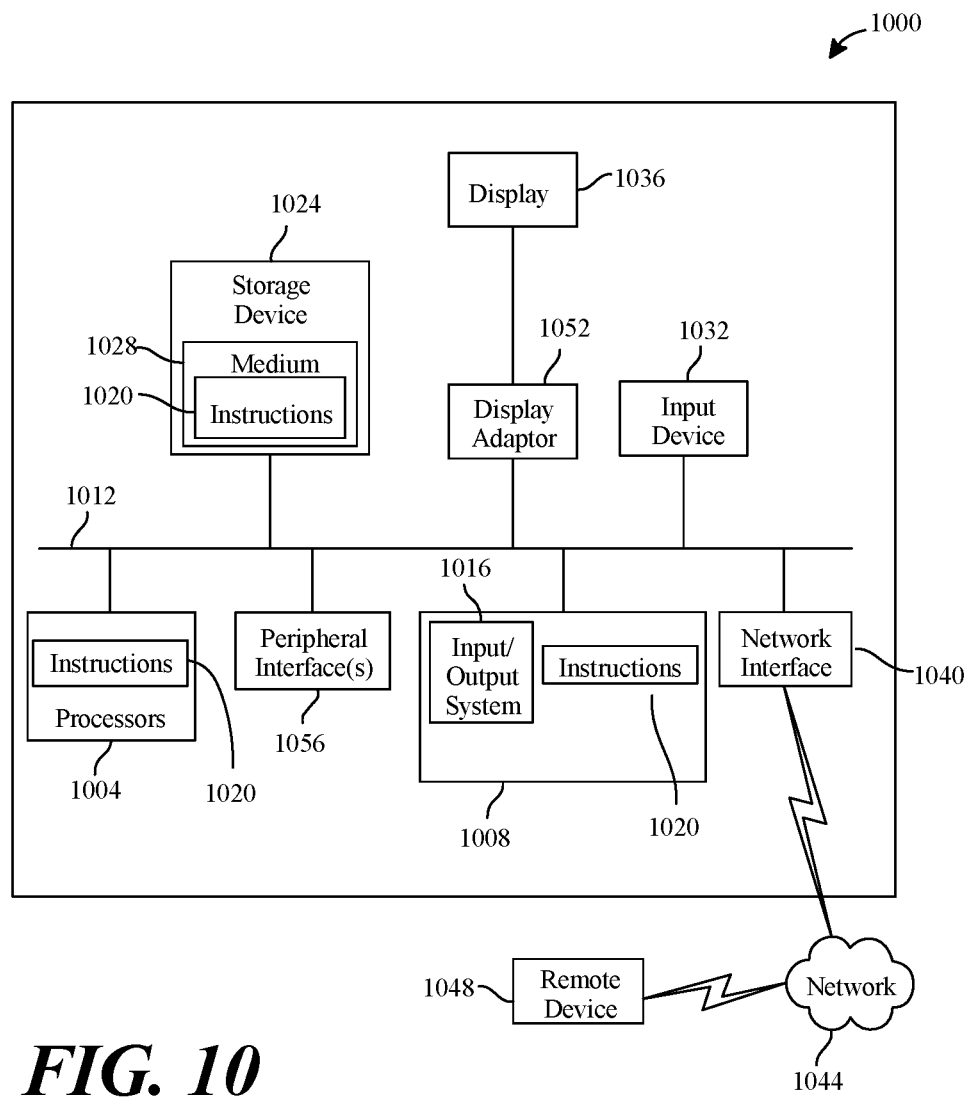
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer apparatus 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer apparatus 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer apparatus 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer apparatus 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer apparatus 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer apparatus 1000. In one example, software 1020 may reside, completely or partially, within machine-readable medium 1028. In another example, software 1020 may reside, completely or partially, within processor 1004.

Computer apparatus 1000 may also include an input device 1032. In one example, a user of computer apparatus 1000 may enter commands and/or other information into computer apparatus 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer apparatus 1000 via storage device 1024 (e.g., a removable disk drive, a flash drive, etc.) and/or network interface device 1040. A network interface device, such as network interface device 1040, may be utilized for connecting computer apparatus 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer apparatus 1000 via network interface device 1040.

Computer apparatus 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer apparatus 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for preconditioning a power source of an electric aircraft, the system comprising:
    a power source of an electric aircraft;
    a computing device, wherein the computing device is configured to:
        receive a flight plan;
        determine a predicted power usage model as a function of the flight plan;
        determine a divergent element as a function of an operating condition of the power source and an optimal performance condition of the power source; and
        initiate a power source modification to the power source of the electric aircraft as a function of the divergent element and the predicted power usage model, the power source modification configured to adjust the operating condition of the power source to the optimal performance condition of the power source; and
    a user device, wherein the user device is configured to:
        display a flight performance infographic as a function of the predicted power usage model.

2. The apparatus of claim 1, wherein computing device is further configured to:
    receive a condition datum from a sensor attached to the power source of the electric aircraft; and
    initiate the power source modification on the electric aircraft as a function of the condition datum.

3. The apparatus of claim 1, wherein the power source modification is generated as a function of a machine-learning model.

4. The apparatus of claim 1, wherein the power source modification is initiated automatically as a function of a proximity to a charging destination.

5. The apparatus of claim 1, wherein the power source modification is initiated automatically as a function of reaching a certain point in the flight plan.

6. The apparatus of claim 1, wherein the user device further comprises a pilot device mechanically connected to the electric aircraft.

7. The apparatus of claim 6, wherein the pilot device is configured to support manual initiation of the power source modification.

8. The apparatus of claim 1, wherein the user device is located remotely from the electric aircraft.

9. The apparatus of claim 8, wherein the remotely located user device is configured to support manual initiation of the power source modification.

10. The apparatus of claim 1, wherein the power source modification further comprises modifying a temperature of the power source to ensure an optimal temperature is reached.

11. A method for preconditioning a power source of an electric aircraft, the method comprising:
    receiving, by a computing device, a flight plan;
    determining a predicted power usage model as a function of the flight plan;
    determining a divergent element as a function of an operating condition of the power source and an optimal performance condition of the power source
    initiating a power source modification to the power source of the electric aircraft as a function of the divergent element and the predicted power usage model, the power source modification configured to adjust the operating condition of a power source to the optimal condition of the power source; and
    displaying a flight performance infographic as a function of the power usage model.

12. The method of claim 11, wherein the method further comprises:
    receiving, by the computing device, a condition datum from a sensor attached to the power source of the electric aircraft; and
    initiating the power source modification on the electric aircraft as a function of the condition datum.

13. The method of claim 11, wherein the power source modification is generated as a function of a machine-learning model.

14. The method of claim 11, wherein initiating the power source modification further comprises initiating the power source modification automatically as a function of a proximity to a charging destination.

15. The method of claim 11, wherein initiating the power source modification further comprises initiating the power source modification automatically as a function of reaching a certain point in the flight plan.

16. The method of claim 11, wherein the user device further comprises a pilot device mechanically connected to the electric aircraft.

17. The method of claim 16, wherein the pilot device is configured to support manual initiation of the power source modification.

18. The method of claim 11, wherein the user device is located remotely from the electric aircraft.

19. The method of claim 18, wherein the remotely located user device is configured to support manual initiation of the power source modification.

20. The method of claim 11, wherein initiating the power source modification further comprises modifying a temperature of the power source to ensure an optimal temperature is reached.

* * * * *